United States Patent [19]

Grimes et al.

[11] Patent Number: 4,736,393
[45] Date of Patent: Apr. 5, 1988

[54] DISTRIBUTED TIMING CONTROL FOR A DISTRIBUTED DIGITAL COMMUNICATION SYSTEM

[75] Inventors: Gary J. Grimes, Thornton, Colo.; Bryan S. Moffitt, Redbank, N.J.

[73] Assignee: American Telephone and Telegraph Co., AT&T Information Systems Inc., Holmdel, N.J.

[21] Appl. No.: 852,852

[22] Filed: Apr. 16, 1986

[51] Int. Cl.$^4$ .............................. H04L 7/00; H04J 3/06
[52] U.S. Cl. .................................... 375/107; 370/103; 375/108; 340/825.14; 340/825.2
[58] Field of Search ............................. 375/107, 108; 340/825.14, 825.2, 825.21; 370/54, 100, 103, 94

[56] References Cited

U.S. PATENT DOCUMENTS 4,142,069 2/1979 Stover ................................. 370/103
4,399,531 8/1983 Grande et al. ......................... 370/94

*Primary Examiner*—Robert L. Griffin
*Assistant Examiner*—Andrew J. Telesz, Jr.
*Attorney, Agent, or Firm*—Donald M. Duft; John C. Moran

[57] ABSTRACT

A timing control arrangement that dynamically controls the distribution of timing information in a distributed digital communication system. A reference timing signal is distributed from a reference master node to all other nodes in the system. The distribution is accomplished on a dynamic basis without the use of a central control. Each node is connected by links to at least one other node and each node receives timing signals from all of the links to which it is connected. Each node selects one of these signals as its timing reference by scanning the various signals it receives to identify the one signal that is applied via a link path that is the "closest" to the master reference node as indicated by information specifying the number of intermediate nodes through which the timing signal has traveled from the reference node to reach the receiving node. This decision is based on a set of bits included in the timing signal transmitted by each node indicating the number of intermediate nodes between itself and the reference node.

26 Claims, 12 Drawing Sheets

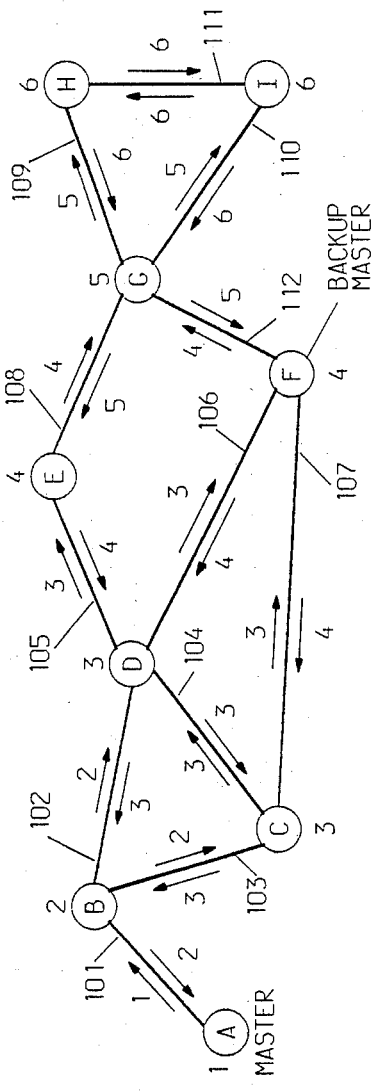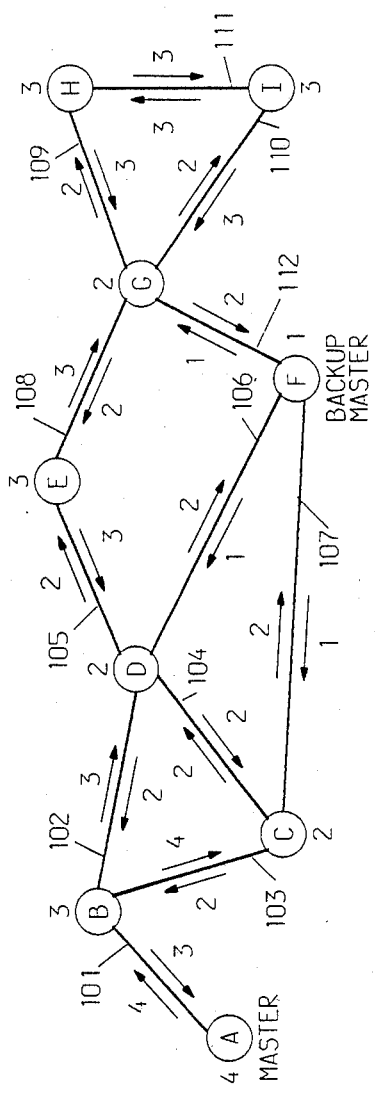
FIG. 1
FIG. 2
FIG. 7
| FIG. 3 | FIG. 5 |
|---|---|
| FIG. 4 | FIG. 6 |

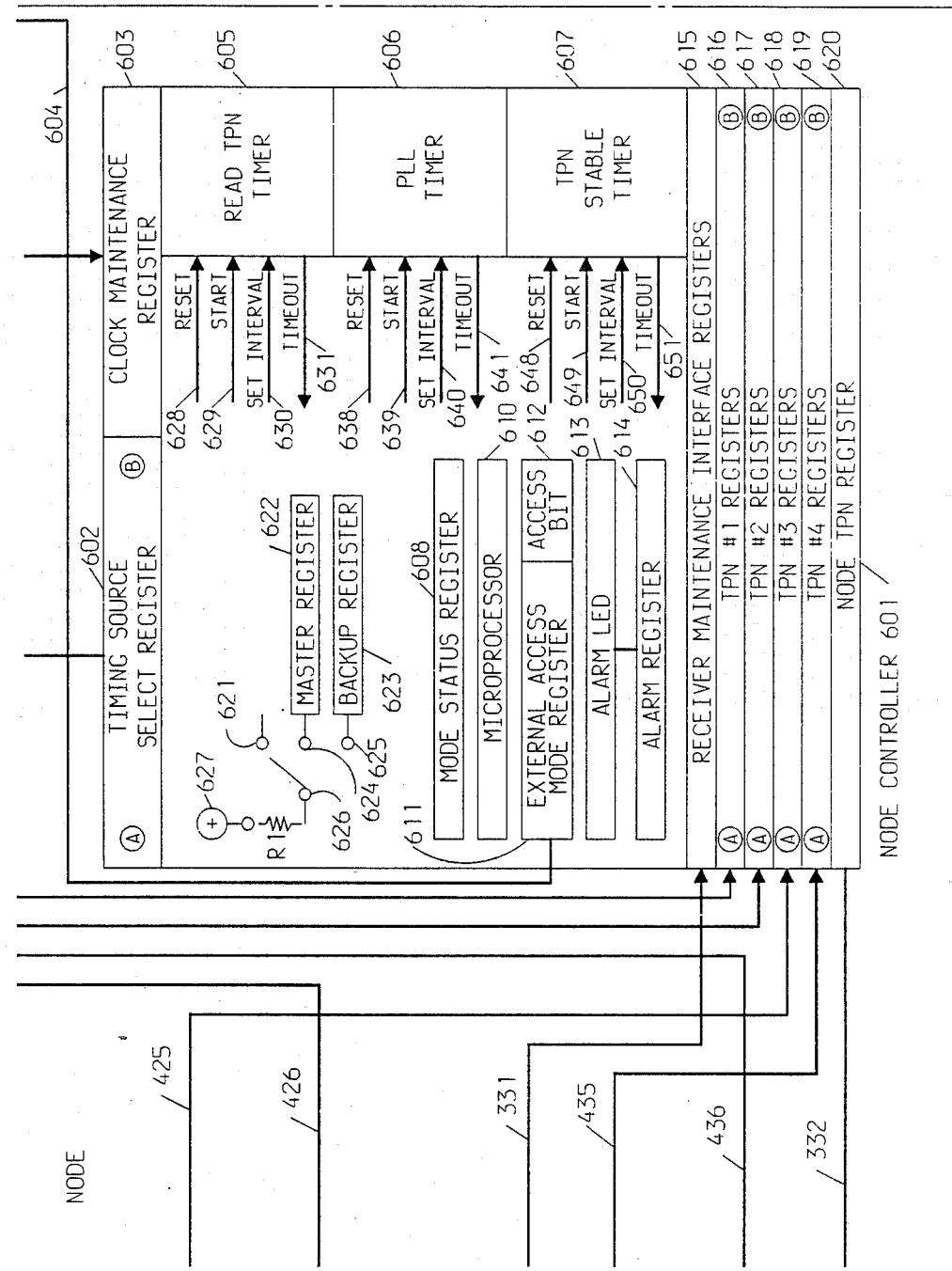

TRANSMISSION OF THE TIMING PRIORITY NUMBER IN TIME SLOT 0

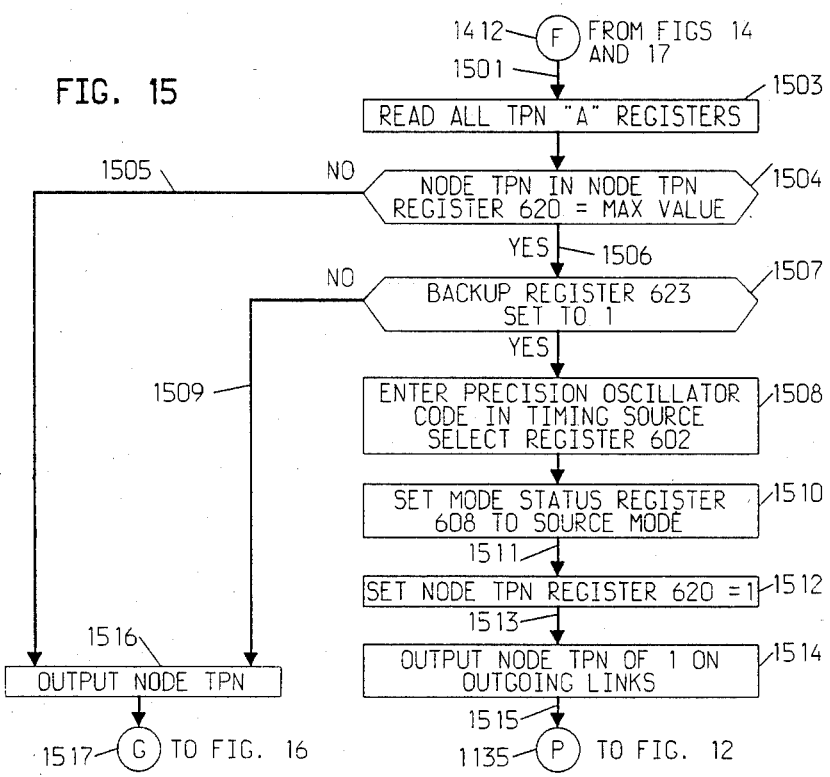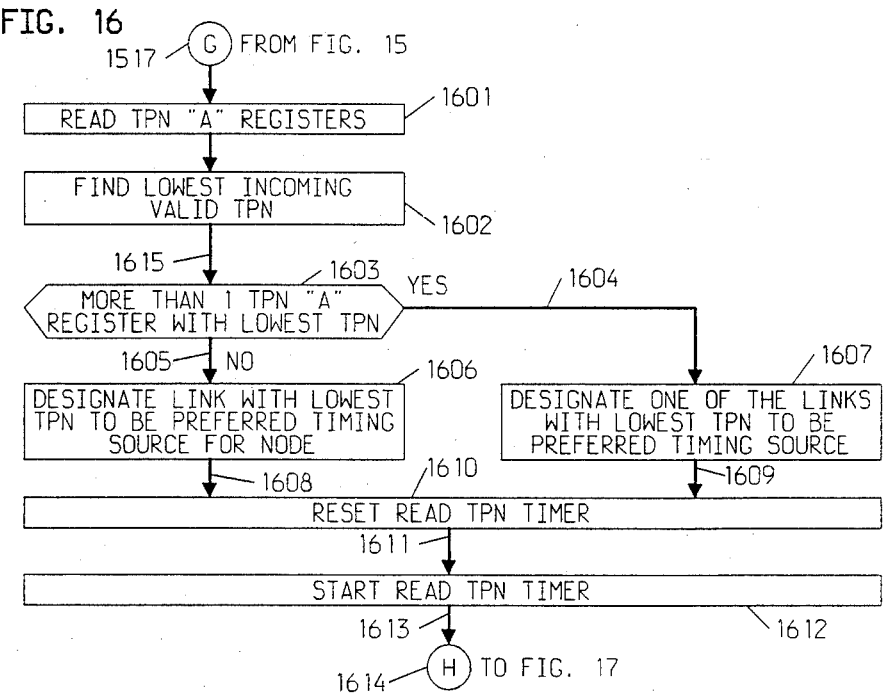

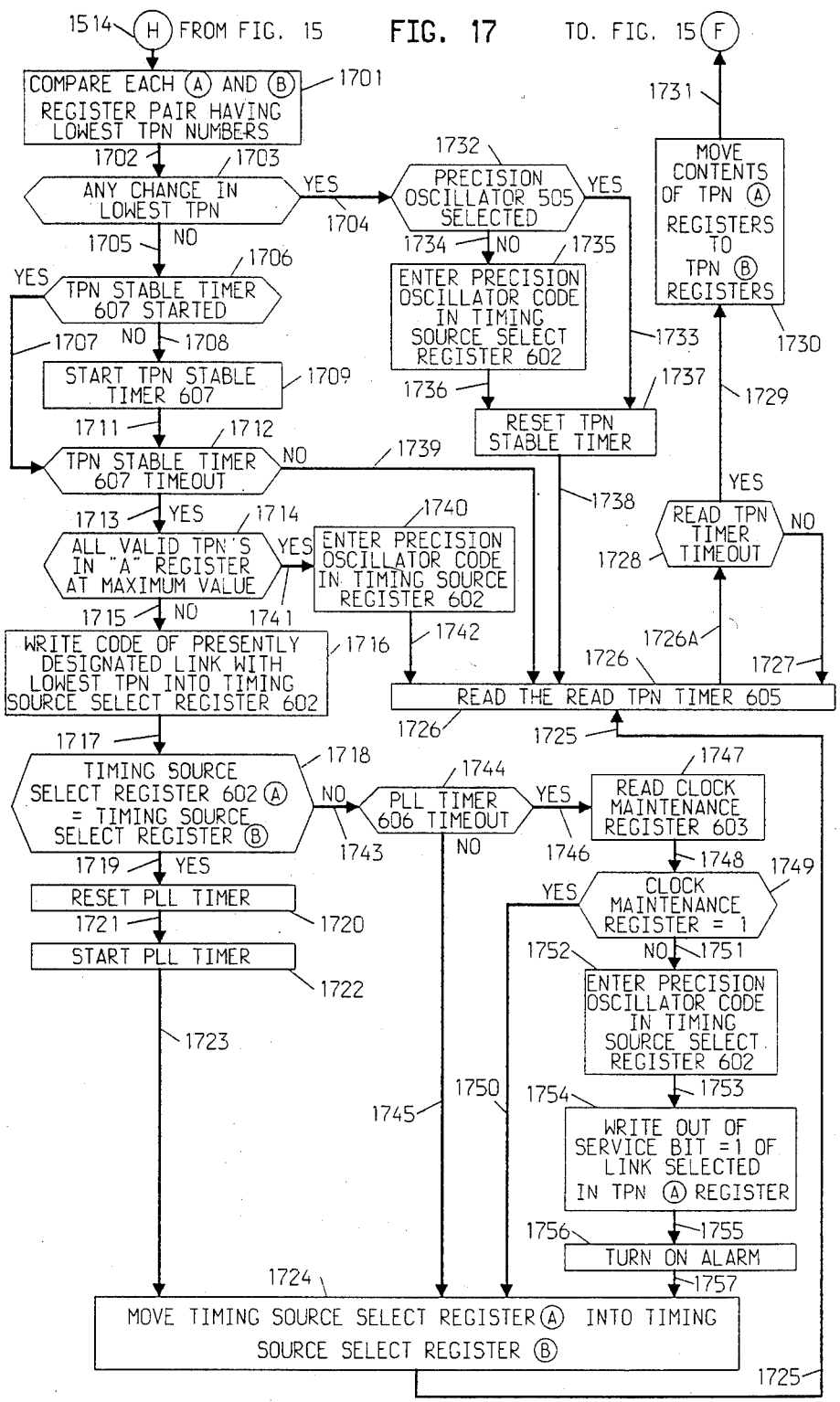

DISTRIBUTED TIMING CONTROL FOR A DISTRIBUTED DIGITAL COMMUNICATION SYSTEM

FIELD OF THE INVENTION

This invention relates to a distributed digital system and more particularly to improved facilities for controlling the timing between the nodes of the digital system.

PROBLEM

It is necessary that all nodes of a distributed digital system, such as a digital switching or transmission system, have precisely synchronized timing so that voice and/or data signals can be transmitted error free between nodes. One way to achieve this timing precision is to transmit timing signals to all nodes from a master signal source so that the timing circuitry at all nodes is synchronized to the same signal. For reliability purposes, it is necessary that the system timing facilities have the capability of maintaining the internode synchronization at all times including circumstances in which the master signal source may fail or become otherwise unavailable. This reliability has heretofore been achieved by the provision of a central controller which is connected to all nodes and which exchanges messages with all nodes to:

(1) Initialize the network and designate the network node that is to provide the master signal from which all other nodes are to take their timing;

(2) Monitor the health of all nodes;

(3) Detect trouble conditions during which one or more nodes may receive either no timing signal whatsoever or a timing signal that has become inadequate for reliable synchronization;

(4) Reconfigure the network timing signal paths when trouble is detected so that all nodes continue to receive a reliable timing signal. In some cases, particularly if the trouble is in the master node, this may require that an alternate master source of timing signals be specified and activated; and (5) Monitor the health of all nodes, via an exchange of messages, to ensure that the network reconfiguration is successful.

The above characterized timing facilities operate satisfactory so as to perform their intended functions. However, these facilities require the use of a centralized intelligent common controller connected to all nodes and they are complex, they are expensive, and they require that messages be sent continuously between all nodes and the central controller. This requirement for the continuous exchange of messages is particularly disadvantageous since the system is ill equipped to transmit and process messages when trouble is detected. The reason for this is that the network is already over burdened with heavy message flow and message processing chores to route traffic around failed nodes even without the additional requirements of reconfiguring the flow of timing. Additionally, it is desirable in modem networks in which control of routing and other functions is distributed, to provide a distributed means of controlling timing flow so that a separate centralized and architecturally incompatible timing controller is not needed. This also allows each node to execute the same software.

SOLUTION

The above problem is solved and a technical advance is achieved by the provisions of improved timing facilities for a multinode digital system. These improved timing facilities do not require the use of a centralized common controller to:

(1) Monitor the current health of network timing at all nodes;

(2) Detect trouble in the timing of one or more nodes; and (3) Reconfigure the network timing signal paths when trouble is detected so as to maintain the precision timing at all nodes.

The above functions are achieved without the use of a centralized common controller. Instead, a distributed timing control arrangement is utilized wherein each node has sufficient intelligence to perform the functions characterized in steps 1, 2, and 3 immediately above.

One node is designated as a master in accordance with the present invention and this master node provides a timing signal that is propagated to all other nodes of the system to provide each node with a timing reference of the required precision. The master node generates a timing priority number (hereinafter TPN), say a 1, which is transmitted from the master node, together with the master node timing signal, to every other node to which the master node is directly connected by a digital transmission path. Each digital transmission path in the present disclosure is divided into frames and time slots in accordance with well known time division multiplexed techniques. In other words, each node to which the master node is directly connected receives timing signals embedded in the stream of useful data sent from the master node as well as a TPN of 1. Each node other then the master operates in such a manner that it increments the lowest TPN it receives by one and then sends this incremented TPN to each node to which it is directly connected. Thus, each node to which the master node is directly connected receives the TPN of 1 from the master node, it increments this TPN of 1 by 1 to form a TPN of 2 and it transmits this TPN of 2 to each node to which it is directly connected including to the master node. Each such directly connected node, other then the master, that receives the TPN of 2 increments the TPN of 2 by 1 and sends a TPN of 3 to each node to which it is directly connected.

This process continues so that each node receives a TPN from one or more other nodes, increments the lowest TPN it receives and transmits its incremented TPN to each node to which it is directly connected.

Most nodes in the network are directly connected to more than one node and thus will receive a TPN from each node to which it is connected. In many cases, a node may receive TPNs of differing values. In this case, the node operates in such a manner that it identifies the lowest valued TPN it receives, it increments only this TPN and only this incremented TPN is sent to the other nodes. The master node does not perform a TPN incrementing function. Instead the master node always generates a TPN of 1 and always sends this TPN of 1 to each node to which it is directly connected. The master node receives an incremented TPN of 2 back from each node to which it is directly connected. However, the master node does not increment a TPN it receives and instead continues to send a TPN of 1 to each node to which it is directly connected.

The node TPNs are transmitted from a sending node to a receiving node over the same path by which data is transmitted between the two nodes. Each node, other than the master node, operates in such a manner that it first identifies the path over which the node receives the lowest TPN and then, it derives the timing signal required by the node from the data signals transmitted over the path that supplies this lowest TPN to the node.

Each node periodically reads the TPNs it receives over the paths to which it is connected and re-evaluates the relative magnitude of the received TPNs to determine that the path over which it is presently receiving the lowest TPN is the same as the path that priorly supplied the lowest TPN and the selected timing signal for the node. This re-evaluation is made periodically and a node takes no action with respect to the control of its timing if no change has taken place regarding which path was and still continues to supply the lowest TPN to the node. On the other hand, if an analysis of the currently received TPNs indicates that the path that is now supplying the lowest TPN is different from the path that priorly supplied the lowest TPN, then the node switches the control of the timing of the node from the prior path to the path that presently supplies the lowest TPN. This situation occurs when the path that priorly supplied the lowest TPN is connected to a node that becomes defective and begins to generate TPNs of increasing value as subsequently described.

The above described capabilities whereby each node takes its timing from the path that supplies the lowest TPN ensures that each node is controlled by the timing signal from the master node over the path that involves the least number of intermediate nodes.

The node that is to be the master node is designated at the time the network is configured and initialized and the master node supplies the timing to all nodes by means of the timing signals embedded in the data signals that are transmitted from the master node to each node to which it is directly connected and from there to all other nodes. At the time the network is configured, one of the other nodes of the network is designated as the backup master node. This backup master functions in the same manner as all the remaining nodes as long as the master node is operative and generates reliable timing signals. However, the backup master node supplies the network timing in the event the master node fails or in the event that the interconnections between the master node and the remainder of the network is severed or otherwise becomes unreliable. The backup master node is programmed with information specifying that it is a backup master and when it detects that the master nodes has failed, it takes charge of network timing by sending out a TPN of 1 over each network path by which it is directly connected to another node.

The backup master determines that the master node has failed by repeatedly analyzing the TPNs it receives and by determining that the TPNs it receives are incremented on each successive analysis. The decision that the master node has failed is made when the received TPNs reach a certain predetermined value. As already mentioned, the master node continuously generates a TPN of 1 and transmits this 1 to each node to which it is directly connected. This TPN of 1 controls each node receiving this TPN in such a manner that the TPN generated by each such receiving node is incremented by 1 and becomes a two. Thus, each node that is directly connected to the master node can only generate a TPN of 2 as long as the master node remains operable and applies its TPN of 1 to each node to which it is directly connected. Each such directly connected node receiving the TPN of 1 cannot possibly generate a TPN of other than 2 as long as the master node remains operable since the algorithm by which each node operates is that is increments the lowest TPN it receives by 1 and transmits this incremented value out to each other node to which it is directly connected.

In an analogous manner, the TPN generated by each remaining node in the network is constrained and remains constant as long as the master node and all other nodes remain operable and supply valid data including constant TPNs. The TPN transmitted by each node is determined by the number of intermediate nodes between a particular receiving node and the master node.

Let it now be assumed that the master node or the paths extending from it to its directly connected nodes becomes inoperable or unreliable. The directly connected nodes now no longer receive a TPN of 1. In this case, there is no constraint on each such directly connected node and it no longer is constrained in its generation of a TPN by the TPN of 1 received from the master node. The directly connected node that is no longer receiving a TPN of 1 from the master node now identifies the lowest valued TPN it is presently receiving from one of the other nodes to which it is connected and it increments this new lowest TPN by 1 and transmits this new TPN to the network nodes to which it is directly connected. These other nodes in turn increment the new TPN they receive and send the newly incremented TPN back to a first node which, in turn, increments the newly received TPN by 1 and sends it back to the other node.

This process continues in such a manner that on each successive interchange of TPNs between a pair of nodes, the TPN associated with a node is incremented by two. The backup master node detects this phenomenon as it receives successively higher valued TPNs. Finally, when the lowest valued TPN reaches a certain predetermined number, such as for example 30, the backup master determines that the timing of the network is unstable and it assumes the roll of a master node. It does this by adjusting its circuitry so that it immediately begins to send a TPN of 1 to each node to which it is directly connected. This causes the timing of the network to become stable and to be controlled by the timing signals from the backup master node.

The backup master node remains in charge of the network until it is advised that the master node is once again operable and at that time the backup master node ceases to generate a TPN of 1. The timing of the network is again brought under control of the master node which is now operable and it again supplies a TPN of 1 to the network nodes to which its is directly connected in the same manner as priorly described.

In summary of the above, it can be seen that the present invention solves the above discussed problem and achieves a technical advance by providing timing facilities which permit a multi-node network's timing to be accurately controlled at all times either by a master node or by a backup node without the necessity of a centralized common controller which must continuously burden the network with the exchange of messages between it and the other network nodes. Thus, the disclosed invention permits the timing of the network to be controlled with precision in a manner that does not involve the cost or complexity of a centralized controller.

BRIEF DESCRIPTION OF THE DRAWINGS

This invention may be better understood by a reading of the following detailed description thereof with reference to the following drawings in which:

FIGS. 1 and 2 illustrate the network topology of one possible network having a plurality of nodes;

FIGS. 3, 4, 5 and 6, when arranged and shown in FIG. 7, disclose the details of the circuitry provided at a node;

FIGS. 11 through 17 illustrate in flowchart form the manner in which the circuitry at each node operates to generate a TPN in response to the various system conditions and states that may be encountered by the node.

DETAILED DESCRIPTION

Figure 3:
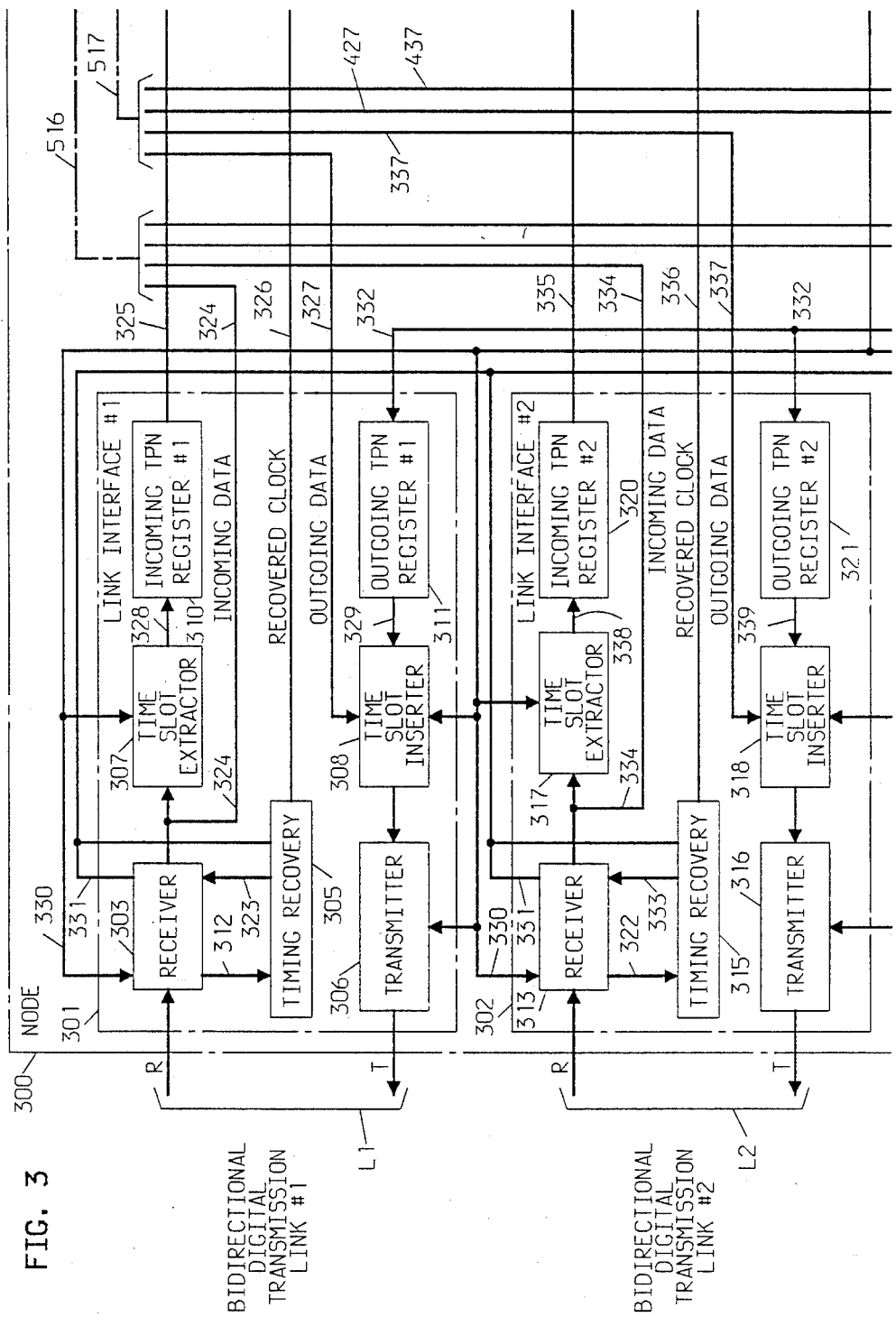

The network topology is shown in FIG. 1 where the network comprises the plurality of nodes A, B, C, D, E, F, G, H and I. The nodes are interconnected by the indicated paths with the numbered arrows. Associated with each path is a TPN number that is transmitted over the path in each direction. The number adjacent to each node indicates the TPN that is generated by the node and transmitted on all of its outgoing links. In FIG. 1, node A is the master node, node F is the backup master and the network conditions portrayed in FIG. 1 indicate that the master node is functioning properly to supply timing signals of the required precision to the rest of the network. Master node A generates a TPN of 1 and transmits it to node B as indicated by the arrow pointing in the direction of node B over path 101. Node B receives this TPN of 1, it increments this 1 by 1 and applies a TPN of 2 over paths 101, 102 and 103 to nodes A, D and C, respectively. Node C receives the TPN of 2, it increments the 2 by 1 and transmits a TPN of 3 to node D over path 104. Node D receives a TPN of 2 from node B and a TPN of 3 from node C. It also receives a TPN of 4 from each of nodes E and F. The TPN of 2 is the lowest TPN received by node D and therefore it increments the 2 by 1 and transmits a TPN of 3 to each of nodes B, C, E and F.

Nodes F, G, H and I work in an analogous manner and receive the indicated TPNs. Each such node increments the lowest TPN it receives by 1 and transmits this incremented TPN to each node to which it is directly connected. Thus, node I receives a TPN of 5 as well as a TPN of 6. Since 5 is the lowest value of the two TPNs, node I increments 5 by 1 and transmits a TPN of 6 to each of nodes G and H.

The circuitry of each node operates in such a manner that the timing of the node is controlled from the signals on the same path that transmits the lowest valued TPN to the node. Thus, node D receives TPNs of 2, 3, and 4. Since 2 is the lowest received TPN, node D uses the signals on path 102 to control its timing. In the same manner, node I uses the signals on path 110 to control its timing rather than the signals on path 111. Using this algorithm, each node receives its timing reference signal either directly or indirectly from the master over the least number of loops possible. Also, each node is prevented from supplying timing back to itself through the network, which would create timing loops and network timing instability.

The system timing remains in the state portrayed by FIG. 1 as long as all elements of the network, including the master node in path 101 remain operable and supply the required timing signals to node B. Now, let it be assumed that either master node A or path 101 encounters problems so that node B no longer receives a TPN of 1 from node A. In this case, a TPN of 3 is the lowest valued TPN received by node B. Node B increments 3 by 1 and generates a TPN of 4 which is transmitted to node C as well as node D. Each of nodes C and D increment the received TPN of 4 and transmit a new TPN of 5 back to node B. Node B, in turn, increments 5 by 1 and returns a new TPN of 6 to nodes C and D. This process continues with respect to nodes B, C and D so that successively higher valued TPNs are generated. The remaining nodes of the network follow in an analogous manner and they also generate successively higher valued TPNs. Backup node F receives these successively higher valued TPNs and when a TPN of a predetermined value is received such as for example the TPN of 30, node F determines that the network timing is no longer reliable and it assumes control of the network timing by changing its operation so that it begins to generate a TPN of 1 which is transmitted from node F over paths 107, 106 and 112 to each of nodes C, D and G.

This condition is portrayed in FIG. 2. The network timing soon establishes and the nodes of the network of FIG. 2 generate and exchange TPNs over the various network paths as indicated by the numbered arrows and the numbers associated with each node on FIG. 2. The backup master remains in control until such time as master node A and/or the path 101 is fixed and again capable of providing reliable timing signals to node B. The master node A resumes its generation of a TPN of 1 which is again transmitted to node B. Then, backup master node F is advised of this condition and it terminates its generation of a TPN of 1. The network is once again under control of master node A. This switchover is accomplished in a manner that both master and backup master are outputting 1's and supplying network timing simultaneously very briefly. This is because the condition of having no master temporarily is more likely to cause network timing instability and more transmission errors than having two masters temporarily.

FIGS. 3, 4, 5 and 6, when arranged as shown on FIG. 7, disclose further details of the equipments comprising any of the nodes A through I of FIG. 1 or 2. Each node contains the equipments required to receive and transmit information over any of the links or paths to which it is connected. This information comprises the TPNs as already described as well as data representing the information that is transmitted over the network from a sending node to a receiving node via any intermediate nodes that may be in the network between the sending and receiving nodes.

Figure 8:
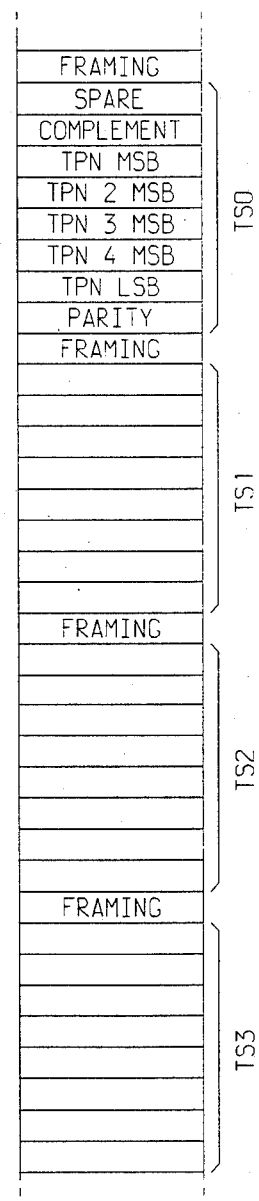
FIG. 8 discloses the protocol used to transmit the TPNs over the network paths.

FIG. 8 discloses the manner in which information is transmitted over the paths of FIGS. 1 and 2 between nodes. The information is in timed division multiplexed form and is transmitted in cyclicly recurring frames with each frame comprising a plurality of timeslots. In the partial frame shown on FIG. 8, timeslot 0 contains the TPN information and the other timeslots contain the data that is transmitted from a sending to a receiving node. Framing signals divide the signals of each timeslot. Timeslot 0 transmits the TPN information in the form of an eight bit word. The first bit is a spare bit that is not presently used. The next bit is a complement bit. Five bits are used to represent the TPN. The final bit is used for parity. The complement bit is used to indicate whether the TPN number is sent in a complementary or non-complementary form. This capability is used for reliability purposes. The TPN can be sent in complementary form periodically to allow faults which cause one or more bits of the TPN to be stuck at a 0 or a 1 to be detected quickly. The framing bit is used in a conventional manner for framing purposes and to permit the receiving circuitry to distinguish the bits of successive timeslots. The TPNs could be transmitted in a message oriented protocol such as HDLC, but the embodiment shown in FIG. 8 is preferred because less processing power and time is required for TPN processing and transmission because no complex protocol must be transmitted.

Figure 4:
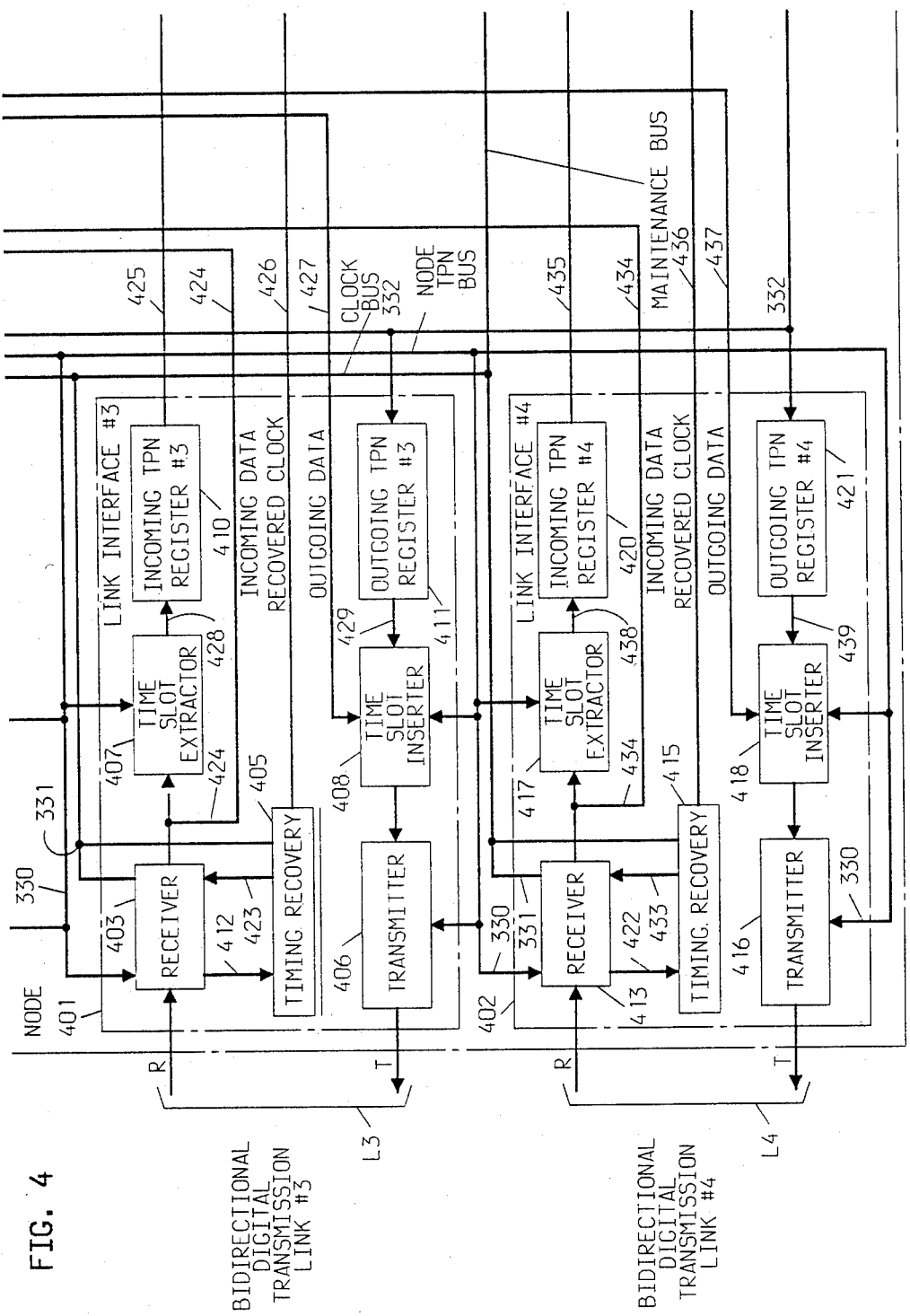

FIGS. 3, 4, 5 and 6, when arranged or shown in FIG. 7, disclose the circuitry comprising a typical node of FIGS. 1 or 2. The node 300 on FIGS. 3 through 6 comprise a plurality of line interfaces 301, 302, 401 and 402 each of which terminates one of the links or paths to which the node is connected. The function of the equipment of a node is to receive information from a connected link and to apply information to the connected link. The bidirectional links on the left side of FIGS. 3 and 4 are designated L1, L2, L3, and L4. These links comprise the paths of FIGS. 1 and 2 connected to the node portrayed by FIGS. 3 through 6. For example, node D of FIG. 1 is connected to the four paths 102, 104, 105 and 106 and therefore, these four paths correspond to the bidirectional links designated L1 through L4 on the left side of FIGS. 3 and 4. Only nodes D and G of FIGS. 1 and 2 are connected to four paths. The remaining nodes are connected to either one path, two paths or three paths. For a node connected to only one path, only one of the links L1 through L4 would be connected on FIGS. 3 and 4. Similarly, less than all of the links L1 through L4 on FIGS. 3 and 4 would be used for the other nodes of FIGS. 1 and 2 that are connected to less than four paths.

In addition to the link interfaces 301, 302, 401 and 402, each node comprises a digital switching or transmission system 501, a clock system 503, and a node controller 601. The digital switching system or transmission system 501 comprises the equipments at the node that receives the data or information, other than the TPN information, that is transmitted over the network between nodes. If the network of FIG. 1 or 2 represents a telephone network, then the element 501 would comprise a digital switching system such as a digital central office or a digital PBX wherein each central office or PBX serves a plurality of connected subscriber stations. On the other hand, if the network of FIGS. 1 or 2 represents a digital transmission system, then element 501 would comprise a digital system serving a plurality of digital transmission facilities.

Clock system 503 comprises a precision oscillator 505 and a timing source selector switch 504 which permits the timing of equipments at the node to be referenced to either the local precision oscillator 505 or to a clock signal recovered from the data applied to the node over any of the connected bidirectional links L1 through L4. The node controller 601 is a microprocessor controlled element having a microprocessor 610 and a plurality of registers and timers which operate under microprocessor control to control the clock system 503 so that the equipments of the node 300 operate under control of a preferred clock signal in accordance with the present invention. The operation of the node 300 and the node controller 601 is subsequently described in detail in connection with the flowcharts of FIGS. 11 through 17.

With respect to link interface 301, conductor R of link L1 carries the signals applied to node 300 and these signals are applied to receiver 303. These signals are divided into discrete timeslots as shown in FIG. 8. Receiver 303 receives these timeslot signals and applies them over its output on path 324 to timeslot extractor 307. Timeslot extractor 307 extracts the TPN information from the bits of timeslot 0 and applies this information over path 328 to incoming TPN register #1 which is also designated as element 310. This TPN is applied over path 325 from register 310 to the A register 616 (FIG. 6). of node controller 601. Each of registers 616-619 comprises A and B sections. The signal applied to receiver 303 is also extended over path 312 to timing recovery element 305 which recovers the clock signal embedded in the received data on the R path of link L1. This clock signal is extracted and applied over path 326 to contact 2 of timing source selector switch 504 of clock system 503. Recovered clock is also applied over path 323 to receiver 303. Clock maintenance information is applied over path 331 to the receiver maintenance and interface registers 615. Path 331 comprises a maintenance bus and one of its functions is to supply register 615 with information indicating whether receiver 303 is receiving valid data and whether timing recovery element 305 is successful in recovering good timing from the signal received by receiver 303 from link L1.

Figure 5:
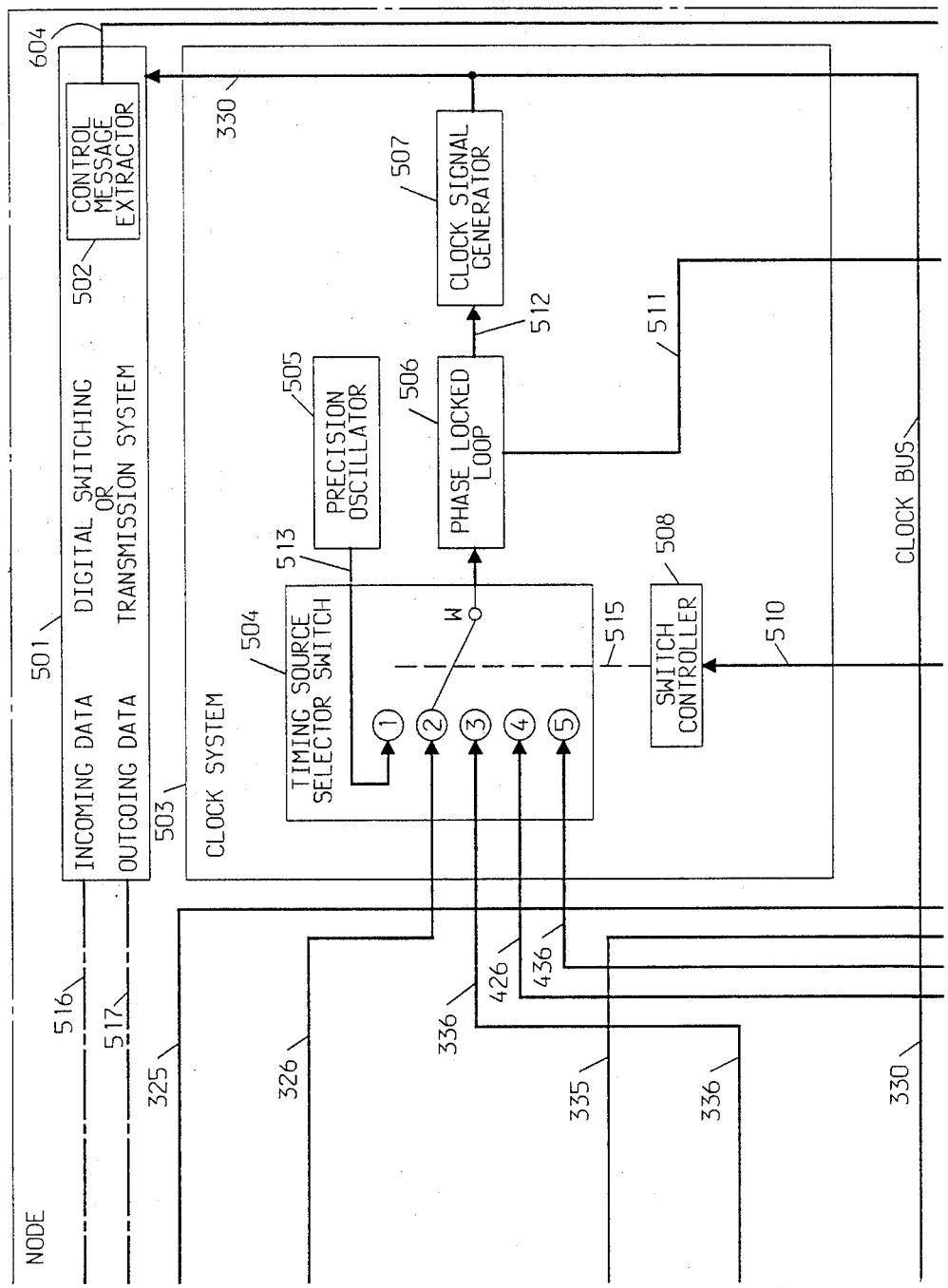

Path 330 extends from the clock signal generator of the clock system on FIG. 5 to the link interface units on FIGS. 3 and 4. On FIG. 3, path 330 connects to timeslot extractor 307 and receiver 303. Path 330 carries the clock signal that controls the operation of the node and therefore, the clock signal on path 330 controls the receiver 303 and the timeslot extractor 307. The signal from the R lead of link L1 is clocked into the receiver 303 using the recovered clock applied on path 323 and the incoming data on path 324 is clocked out of the receiver 303 using the clock signals applied on path 330 from the clock system 503 of FIG. 5.

The output of receiver 303 is also extended over path 324 and cable 516 to the input of the digital switching or transmission system 501. This path carried all the timeslot signals on incoming path R of link L1 and applies them to the digital switching or transmission system 501. Thus, system 501 receives all of the timeslot signals applied to receiver 303 while incoming TPN register 310 receives only the timeslot 0 signals representing the TPN that is transmitted over path L1 to the node represented by the circuitry of FIGS. 3 through 6.

Digital Switching or Transmission System 501 applies the data it wishes to transmit to another node to cable 517 and from there to the link interface and link that is to extend this data to the other node. Let it be assumed that the data is to be transmitted over link L1. In this case, the data from system 501 is applied to path 327 where it is inserted into a signal comprising a series of timeslots as on FIG. 8. Timeslot inserter 308 also receives from element 311 the TPN that is to be transmitted in timeslot 0. Inserter 308 combines the timeslot data on path 327 with the TPN on path 329 and applies the resultant signal systems to transmitter 306 for transmission over path T of link L1 to the node connected to other end of the link. The timeslot inserter receives the node clock signal on path 330. The clock signal on path 330 is also extended to transmitter 306 to control its operation and this clock signal is embedded in its data stream for recovery at the node which terminates it. The TPN that is to be transmitted from the node over link L1 is stored in register 620 and extended over path 332 to the outgoing TPN register 311 for line interface 301. The outgoing TPN information is inserted into register 311 and applied by this register over path 329 to timeslot inserter 308. Inserter 308 inserts the outgoing TPN into timeslot 0 and inserts the information on path 327 into the remainder of the timeslots of each frame generated by link interface 331. The timeslots of each generated frame are applied from inserter 308 to transmitter 306 which in turn extends them over path T of link L1 to the node of the network connected to the other end of link L1.

Figure 9:
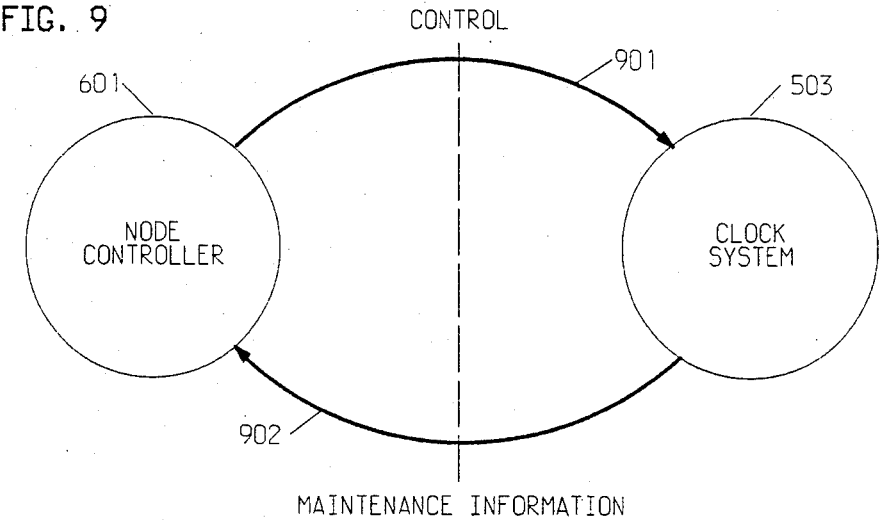
FIG. 9 discloses the relationship between the system clock timing and synchronization facilities and the facilities used to control and generate the TPN at each node.

FIG. 9 portrays the manner in which the clock system 503 interacts with the node controller 601 and, in particular, the processor controlled portion of the node controller. The node controller 601 applies control signals over path 901 to control the setting of timing source selector switch 504 to determine the source of timing signals to which the circuitry that is to control the node. This source may either be precision oscillator 505 internal to the node, or it may be a clock signal that is recovered from the data applied to the node over any one of the links L1-L4 incoming to the node. The clock system 503 monitors this operation and returns information over path 902 to the node controller 601 with the returned information representing the state of the system 503 under various conditions that may be encountered. In most instances, the information on path 902 will require no change as to the clock signal that is to control the node. On the other hand, under certain system conditios or states, the returned information may cause the node controller to decide that the signal source currently controlling the node timing is unreliable and that therefore, the timing control of the node should be switched to a different source of clock signals. The node controller 601 constantly monitors TPNs coming into the node and applies control signals on path 901 to control which internal or external source of timing clock system 503 selects as its timing reference signal based on current and recent TPN information and the maintenance information received on path 902. The manner in which this is accomplished is described in detail in the flowcharts of FIGS. 11 through 17.

Figure 10:
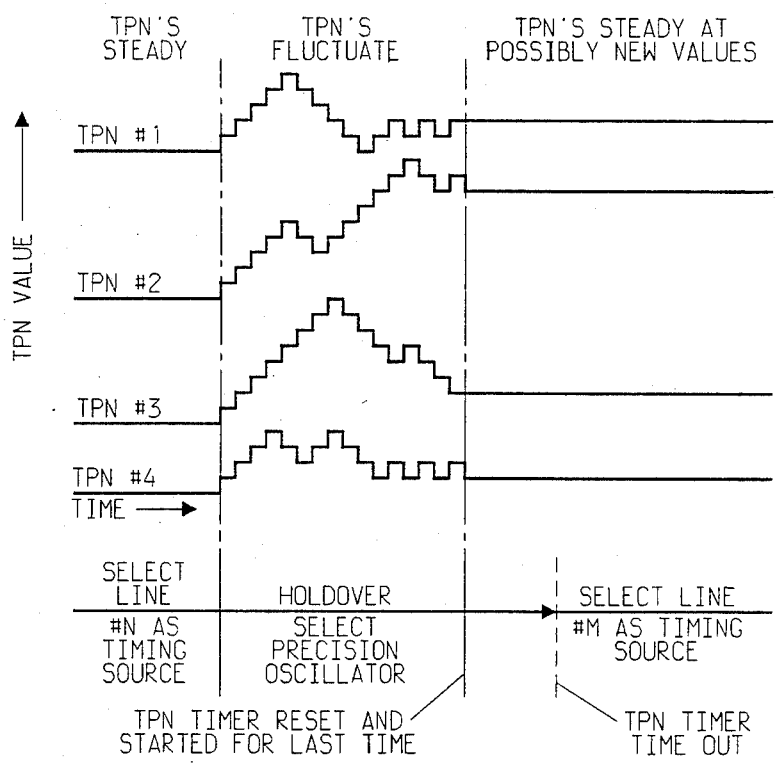
FIG. 10 illustrates the manner in which the TPN generated by node can vary under certain system conditions.

FIG. 10 portrays the manner in which the TPN generated by each node normally remains steady but may vary under certain conditions. The first TPN received by a node is shown on the top line of FIG. 9 and is designated TPN #1. The next line down is designated as TPN #2 and so on for the third and fourth lines which are designated TPN #3 and TPN #4. The bottom line is a time line having three different states. The left most state represents a steady state in which the node controller has analyzed the four incoming TPNs and has selected the lowest one of them to control the timing of the node. The second state of the system that may be encountered is termed "Select Precision Oscillator". During this state, the TPN received on each path fluctuates as indicated. This represents an unstable timing state of the system and, if the timing becomes sufficiently unstable, the node controller selects the precision oscillator 505 of the node to be the source of timing for the node for the time being. The next state of the system is entitled at the top "TPN Steady at Possibly New Values". The value of the TPN received on each path is steady as indicated by the horizontal line associated with each TPN and once again the node controller selects the lowest valued TPN to identify the path that provides the source of clock signals for the node. In this example, TPN #4 remains the lowest after the fluctuations and the recovered timing signal from the link supplying TPN #4 would again be selected as the source of timing for the node. This switch to a new source of timing signals is made a finite interval of time after conditions stabilize as is subsequently described in connection with the flowcharts of FIGS. 11 through 17.

The following describes the operation of the system under various conditios with reference to the flowcharts of FIGS. 11 through 17. The process begins with element 1101 on FIG. 11 when the system is first activated. The system is activated at element 1101 and the process continues to element 614 where the system reads the contents of the alarm register 614. This register stores the alarms representing the various conditions that may be encountered by the system. The process continues to element 1115 where it is determined whether or not alarm register 614 is set to a state representing an alarm. If the answer is no, the process advances over path 1123 to element 1117. If the answer is yes, the process advances over path 1126 to element 1116 in which the system clears the alarms and alarm register 614. The process then advances over path 1127 to element 1117 in connection with which the B portion of the clear timing source select register 602 is initialized. This register 602 has an A portion and a B portion as indicated and the contents of the A portion of the register control the setting of the switch 504. In other words, the A portion of register 602 contains information identifying the timing source that presently controls the timing of the node. This register has an A and a B portion whose contents are sometimes compared as is subsequently described.

Figure 11:
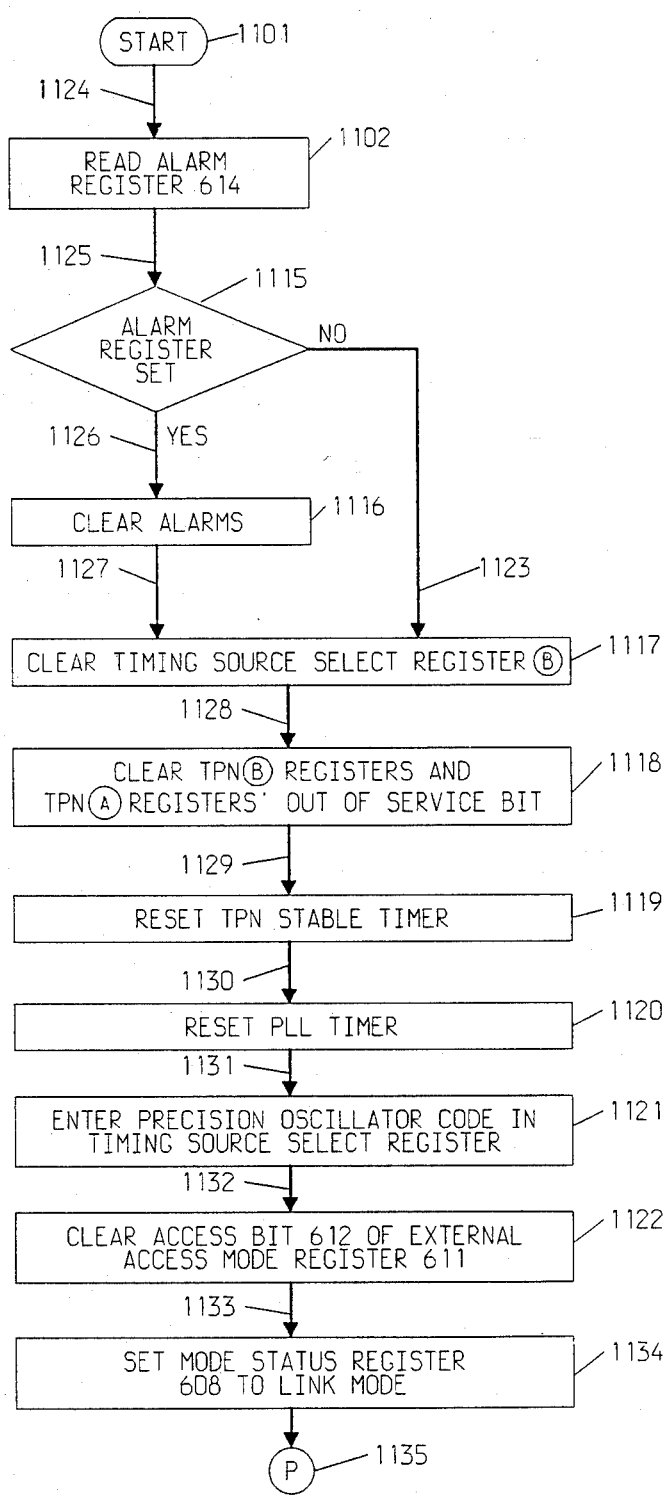

FIG. 11 represents an initialization operation and during this initialization, element 1117 clears the B portion of register 602. The process continues over path 1128 to element 1118 in which the B portions and the out-of-service bit of the A portions of the TPN registers 616, 617, 618 and 619 are cleared. The process continues to element 1119 in which the TPN stable timer 607 is reset. The TPN stable timer 607 and the subsequently described PLL timer 606 and read TPN 605 timer remain in the reset state until explicity started. The process then contines to element 1120 in which the system resets the PLL timer 606. The process continues to element 1121 in which the system then enters the precision oscillator code into the timing source select register 602. This code of the precision oscillator is entered into the A portion of register 602. The entry of this code into the A portion of register 602 controls the operation of switch 504 via controller 508 so that switch contact W engages contact 1 of the switch to connect the output of the precision oscillator 505 to the input of the phase lock loop 506 via path 513. This switches the control of the timing circuitry of the node to the output of the precision oscillator 505. During initialization and some subsequently described failure states, the precision oscillator is selected as the source of timing for all nodes so that the errors rate on the links will be as small as possible and the system will be able to transmit enough valid TPNs to progress to a synchronized state as subsequently described.

The process of FIG. 11 continues to element 1122 in which the system clears the access bit portion 612 of the external access mode register 611. The state of the access bit is, as subsequently described, determines whether the node controller examines and responds to the information in the external access node register 611. It analyzes the contents of register 611 is the access bit 612 is set to a 1. It disregards the state of the register 611 if the access bit 612 is a zero. As is subsequently described, the external access mode register 611 is used to override the state of switch 626 and to cause the clock system 503 to respond to the information in register 611 rather than respond to the information that is normally provided by the present position of switch 626 and the TPN information. A node normally operates as a master node if switch 626 is set to position 624 and as a backup master if the switch is set to position 625. The node operates as neither a master or backup master if switch 626 is set to position 621.

The process proceeds over path 1133 to element 1134 in which the mode status register 608 is set to the link mode. The term link mode means that the node does not, for the time being, operate as a source of timing signals, but, instead, is to have its timing circuitry controlled by a timing signal received from another node. The above described functions on FIG. 11 initialize the system and prepare it for the following described.

Figure 12:
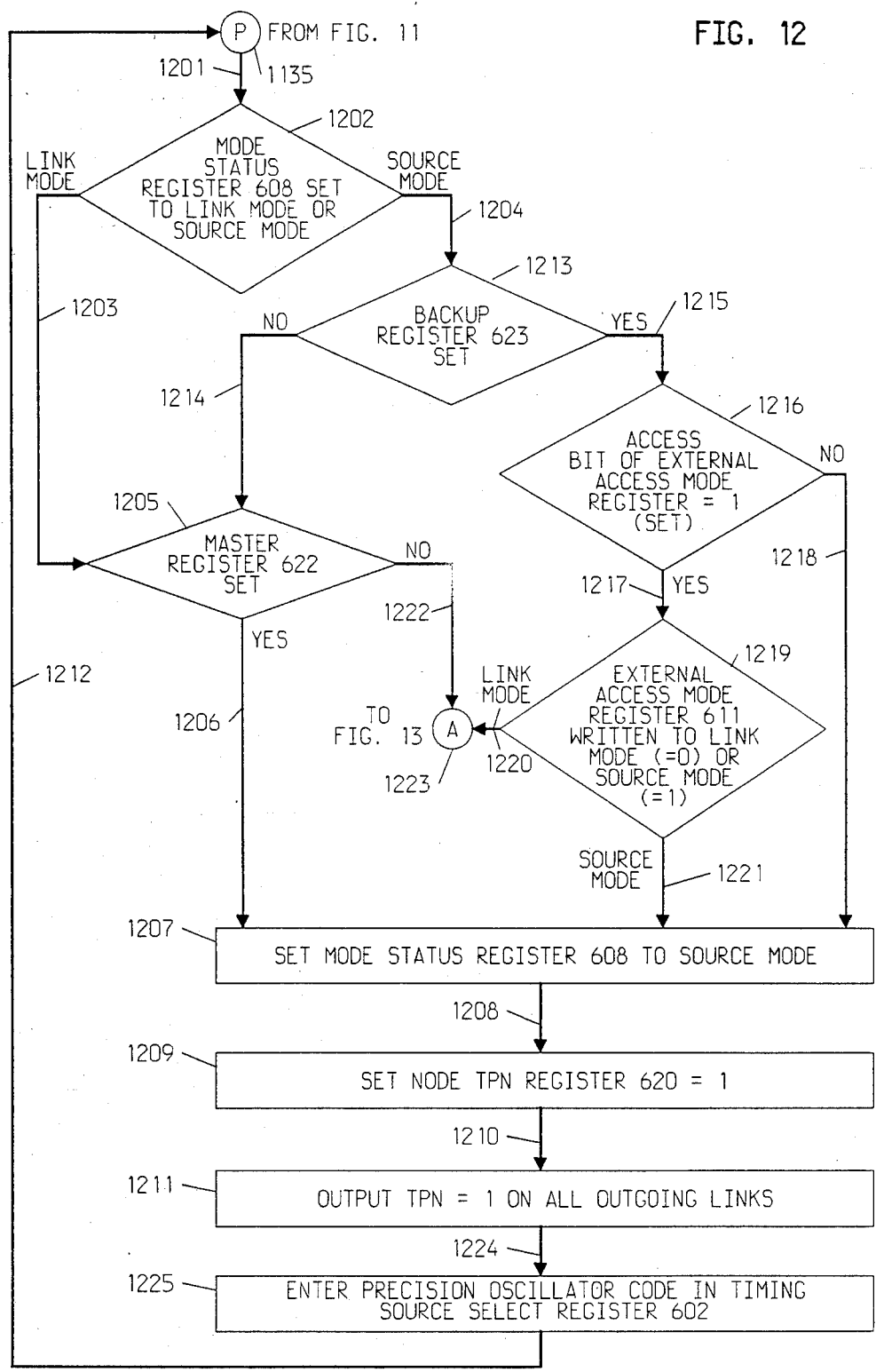

The process next extends from P on the bottom of FIG. 11 to P on the top of FIG. 12. The process proceeds over path 1201 to element 1202. This is a decision element in which a determination is made as to whether the mode status register 608 is in its link mode state or in its source mode state. The mode status register 608 is every node is set at the present time to its link mode state since this was done in element 1134 when the system was initialized. Therefore, the process extends over path 1203 to element 1205 which determines whether or not the master register 622 is presently set by switch 626. Let it be assumed for the time being that the node that is being described with reference to the flowchart of FIG. 12 is the master node. Therefore, the master register 622 is set and the process continues over path 1206 to element 1207 which sets the mode status register 608 to its source mode status. This indicates that this mode is to provide the timing signals for the network. In other words, it is to be the master node. The process continues over path 1208 to element 1209 in which the node TPN register 620 is set to 1. The process continues over path 1210 to element 1211 which causes a TPN of one to be transmitted out from this node to all other nodes to which this node is connected directly via one of its links L1-L4. The process next advances to element 1225 which enters the code of precision oscillator 505 into the A portion of timing source select register 602. This causes switch 504 to connect the output of oscillator 505 to phase lock loop 506. Clock signal generator 507 then supplies a clock to system 501 and the link interfaces 301, 302, 401 and 402 which embed the clock in the data they transmit to other nodes. This node is therefore now in charge of the network timing.

The process now advances to the circle P at the top of FIG. 12.

The process extends through element 1202 to the Source Mode output of the element since the presently described node is operating as a master. The process now advances over path 1204 to element 1213. The backup register 623 is not set for this node and therefore the process advances over path 1214 to element 1205 which determines that the master register 622 is set. The process then advances through elements 1207, 1209, 1211 and 1225 whose functions have already been described.

The process repeats, as already described, through elements 1202, 1213, 1205, 1207, 1209, 1211, and 1225 which continues to cause a TPN of 1 to be extended out over all links of this node to the nodes connected to the other end of links L1-L4. The master node continues sequencing through the same elements as already described as long as it remains in an operable state and in charge of the control of the timing of the network.

The following paragraph describes the process followed on FIG. 12 for a node that is not the master node. All such nodes are referred to as a link node. The process begins on element P at the top of FIG. 12 and extends over path 1201 to element 1202 which determines that the node is a link node and extends the process of over path 1203 to element 1205. Switch 626 of this node is not set to its master position and therefore the master register 622 of this node is not set. The process continues from the NO output of element 1205 and over path 1222 to element 1223 which is designated as an A within a circle.

Figure 13:
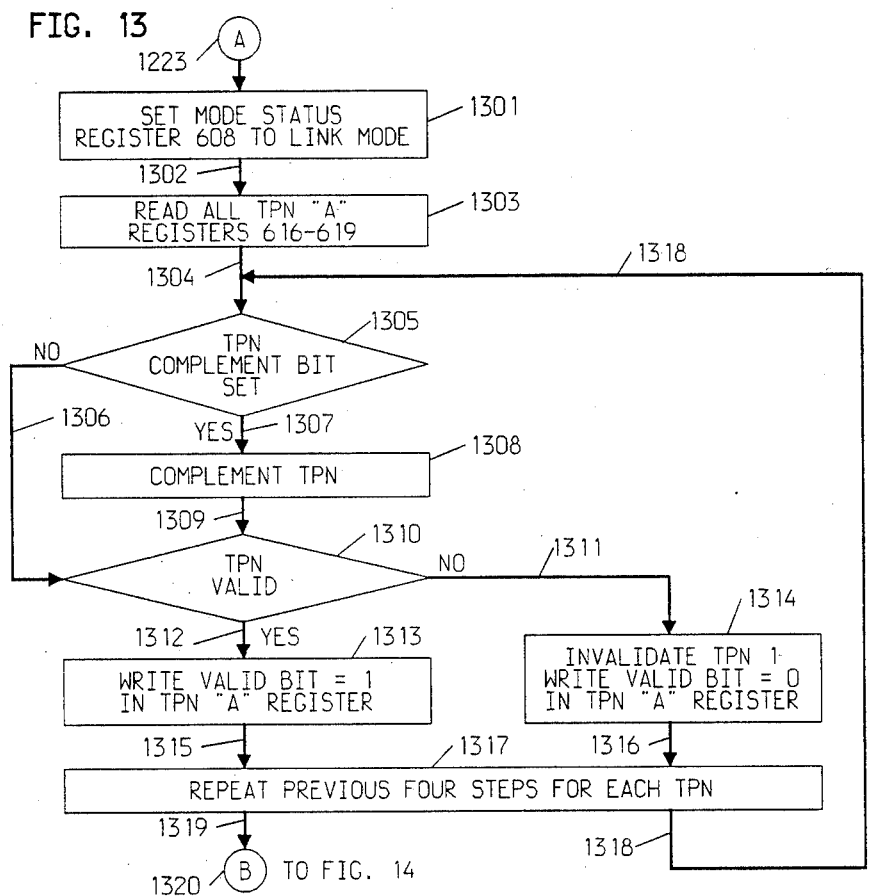

The process advances to element A on the top of FIG. 13. The process extends from element A within the circle to element 1301 which causes the mode status register 608 to be set to the link mode. This causes the node controller of the node to operate in its link mode in which the timing of the node is controlled by signals received over the links L1-L4 connected to the node. The process then extends over path 1302 to element 1303 which causes the A half of the TPN registers 616 through 619 to be read. These registers at this time contain the TPNs that are being received over the incoming links L1-L4 from other nodes.

The process then extends over path 1304 to element 1305 which determines whether the complement bit of the timeslot per FIG. 8 is in a set state. If it is not in a set state, the process extends over path 1306 to element 1310 which determines the validity of the received TPN. If the complement bit is in a set state, the process extends from element 1305 and over path 1307 to element 1308 which complements the received TPN to derive the true TPN. The process then extends over path 1309 to element 1310 which determines the validity of the received TPN. If the received TPN is valid, the process extends over path 1312 to element 1313 which causes a validity bit of 1 to be written into the A section of the TPN register associated with this TPN. This is one of registers 616 through 619. The particular TPN register that is written is that which is associated with the link on which the TPN now being analyzed is received. The process then extends over path 1315 to element 1317.

If element 1310 determines that the received TPN is not valid, the process extends over path 1311 to element 1314 which causes the analyzed TPN to be invalidated. A TPN is invalid if it has bad parity, if it is out of the valid range of TPNs, or if its associated out of service bit is set to a 1 as subsequently described. This is accomplished by writing a validity bit equal to 0 in the A section of the TPN register associated with this received TPN. The process then extends over path 1316 to element 1317 which causes the previously described four steps, beginning with element 1305, to be repeated for each of the remaining three received TPNs. Finally, after all four received TPNs have been deteremined to be valid or invalid, as the case may be, and the appropriate results entered into the associated TPN registers, the process extends over path 1319 to element 1320 which is designated as a B within a circle.

Figure 14:
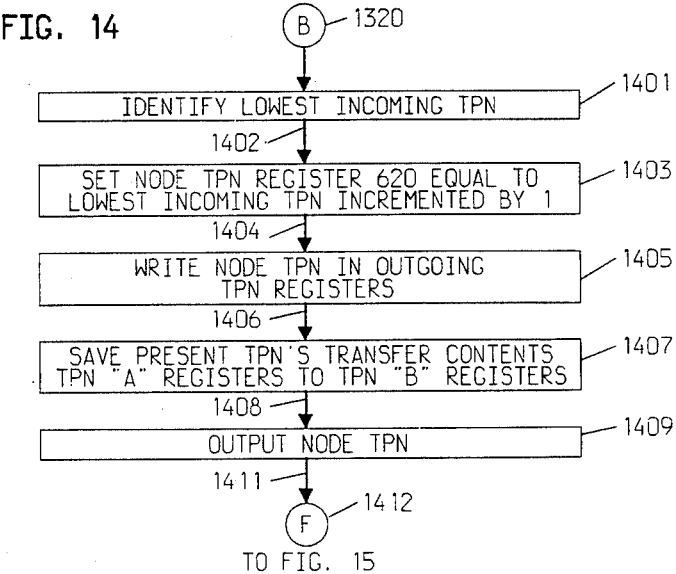

The process next extends from the bottom of FIG. 13 to element B on the top of FIG. 14. At this time, the node controller 601 contains in the A section of its four TPN registers 606 through 619 the four TPNs that are received on the four links L1-L4 incoming to this node. This statement presupposes that this node is connected to four links and therefore four TPNs are received. If this is not the case, then a fewer number of TPNs are received on the links that are connected to the node and these TPNs are stored in the appropriate ones of registers 616 through 619.

The process extends on FIG. 14 from element B to element 1401 which causes the node controller 601 to identify the one of the TPN registers 616 through 619 that contains the lowest incoming TPN. This lowest TPN is identified and the process extends over path 1402 to element 1403 which causes the node TPN register 520 to be set to a value that is equal to the lowest incoming TPN incremented by one. This number in register 620 becomes the TPN of the node. The process extends over path 1404 to element 1405 which causes the TPN in register 620 to be transmitted over path 332 to the outgoing TPN register in each of the link interfaces such as 301. This is register 311 for interface 301. The other registers for the other interfaces are registers 321, 411, and 421. The circuitry of each line interface then causes the TPN registered in its outgoing TPN register to be inserted into its timeslot 0 signal and transmitted out over the T path of the link L1-L4 to the network node connected to the other end of the link.

The process continues over path 1406 to element 1407 which enters the contents of the A portion of registers 616 through 619 into the B portion half of these same registers. As is subsequently described, this permits a comparison to be made between a priorly received and a presently received TPN for each register. The process then proceeds over path 1408 to element 1409 which causes the node TPN to be transmitted out from the outgoing TPN register of each link interface out over the associated link to the network node connected to the other end of the link. The process then proceeds over path 1411 to element 1412 which is designated F within a circle and from there to the top of FIG. 15.

On the top of FIG. 15, the process extends over path 1501 to element 1503 which reads the present content of all TPN A registers 616-619. The process then extends to element 1504 which determines whether or not the TPN in the node TPN register 620 equals its maximum value. What is meant by maximum value is that there is a range of acceptable TPN values that the TPNs may assume without representing a network trouble condition. As already mentioned, the master node generates a TPN of 1 and each other node in the network generates a TPN which is dependent upon the number of nodes it is removed from the master node. It has also been mentioned how the TPNs generated by the various nodes increase if the master becomes inoperable and no longer supplies a TPN of 1 to each node which it is directly connected. This continued increase in the value of the TPN generated by a node is used in the present invention to indicate a trouble condition.

Let it be assumed that a TPN of 30 generated by a node indicates that the node is not receiving valid timing information from another node in the network. This determination is made by element 1504. If the answer to the decision of element 1504 is no, then the node is receiving good timing signals and the process extends over path 1505 to element 1516 which causes the node TPN in register 620 to be outputted to the outgoing TPN registers 311, etc. which, in turn, transmit the node TPN over their associated links. The process then extends to element 1517 which is a G within a circle and from there to element G on top of FIG. 16. FIG. 16 is subsequently described.

If element 1504 determines that the value of the TPN in the node TPN register 620 has reached a maximum value, such as for example 30, the process then extends over path 1506 to element 1507. This element determines whether or not the node being described is a backup master node. If it is not, then the process extends over path 1509 and the node TPN in register 620 is transferred to the line interfaces and from there over the respective links to the other network nodes. On the other hand, if the node being described is a backup master node, then the process extends to element 1508 which causes the switch 504 to apply the output of the precision oscillator 505 to the output of the phase locked loop 506. The output of the phase locked loop 506 then is applied to the clock signal generator 507 to place the node under control of its own precision oscillator.

The process then extends to element 1510 which sets the mode status register 608 to source mode to indicate that this mode is now generating the timing signals required to control the network. The process next extends over path 1511 to elemetn 1512 which causes a TPN of 1 to be entered into node TPN register 620. The process now extends over path 1513 to element 1514 which causes the node TPN of 1 to be transmitted out via the line interfaces of FIGS. 3 and 4 to the associated links and from there to the network nodes to which these links are connected. The process then extends over path 15 to element 1135 which is designated as a P within a circle and is also shown on the top of FIG. 12.

In partial summary, the process shown on FIG. 15 has determined that the backup master node is receiving invalid timing information and has placed it in charge of the network for the time being by cuasing it to begin outputting a TPN of 1 to the nodes to which it is connected.

From element P on the bottom of FIG. 15, the process now returns to element P on the top of FIG. 12 where the process enters element 1202 which determines that the mode status register 608 is set to the source mode and therefore outputs the process over path 1204 to element 1213. From there, since the backup register 623 is set, the process extends over path 1215 to element 1216.

Let it be assumed for the time being that the access bit 612 is not set to a 1 and therefore, the process extends over path 1218 to elemetn 1207 which causes the mode of the status register 608 to be set to the source mode. Since this register is already in this mode, no further action is taken by this element. The process then extends to element 1209 which sets the mode TPN register 620 to a 1 and then outputs this 1 on all outgoing links of the node in element 1211. Element 1225 selects the precision oscillator 505 so that it is in charge of the timing as already described. The process then extends over path 1212 then loops through the same sequence of elements as long as the access bit register 612 is not set.

Finally, after a period of time the maintenance personnel will fix the problems in the master node and this node will then once again take charge of the network. This is done by transmitting an appropriate message in one of the timeslots to this node. This message is entered into register 502 of system 501 and is transferred from there over path 604 where its contents are entered into the external access mode register 611 with the access bit 612 being set. The process then extends from element P on FIG. 12, through element 1202 to element 1213 where the backup register 623 is still set since the currently described mode is a backup master mode. From there the process extends to element 1216. At this time, the external access bit 612 is a 1 since a message has been received by element 502 and entered into external access mode register 611. Therefore the process now extends over path 1217 to elemetn 1219. Element 1219 now analyzes the message in the external access mode register 611 to determine its contents. Since it is now desired that the master node resume control of the system, the message presently in register 611 specifies that the node is to once again operate as a link node. This means that it is to receive timing signals from other nodes and to cease operating as a master node. Therefore, the process now extends over path 1220 to element A and there to FIG. 13 which enters the process already described.

With reference to element 1219, if the message written into register 611 specifies that it is to continue operating as a source node, then the process extends over path 1221 to element 1207 and the process continues using elements 1209, 1211 and 1225, etc. as already described.

At this time, the master node is once again in charge of the system, it is generating a TPN of one and the timing signals it transmits out over its links are the timing signals that control timing of all other network nodes as already described.

Now let it be assumed with reference to FIG. 15 that element 1504 determines that the node TPn is within an acceptible value and so the process extends over path 1505 to element 1516 and from there to element G on FIG. 16. On FIG. 16, the process extends from element G to element 1601 which reads the contents of the TPN A registers 616 through 619. The process then extends to element 1602 which finds the TPN A register having the lowest TPN. The process then extends over path 1615 to element 1603 which determines whether or not more than one A register has the same lowest TPN value. If the answer is no then the process extends over path 1605 to elemetn 1606. In this element the microprocessor 610 operates internally to preliminarily designate the link associated with the lowest TPN. This link is to be the preferred timing source for the node.

With reference to element 1603, if the answer is yes, the process extends over path 1604 to element 1607 wherein the processor 610 operates internally to designate one of the links having the lowest TPN as the link that is to be the preferred timing source for the node.

The process then extends either over path 1608 from element 1606 or over path 1609 from element 1607 to element 1610 which causes the read TPN timer 605 to be reset. The process then extends over path 1611 to element 1612 which starts the read TPN timer and its timing function. The purpose of the read TPN timer is to limit the rate at which the reading operation of the TPN take place. The timer prevents this operation from occurring to frequently by permitting it to occur only when the timer times out. The process now extends over path 1613 to element 1614 which is also designated H within a circle. From there, the process continues to element H on FIG. 17.

On FIG. 17, the process extends from element H to element 1701 which compares the A and B sections of the TPN register 616–619 pair of pairs having the lowest TPN. If a single A and B register pair has the lowest TPN then only its A and B sections are compared. If two or more such pairs have the lowest TPN, then the A and B section of each pair having the same lowest TPN is compared.

The process then extends over path 1702 to element 1703 which determines by a comparison of the A and B section of the various one or more TPN register pairs whether there has been any changes in the lowest TPN recently received. If the answer is no, the process extends over path 1705 to element 1706 which determines whether the TPN stable timer 607 has been started. This timer is normally in a timed out state corresponding to the state of the system in which no change in the lowest TPN has occurred for a period greater than its timeout period. It is reset when a change is detected in the lowest received TPN. A new link cannot be selected as a timing source until this timer times out. This timer thereby affectively limits the frequency at which new links can be selected as new timing sources.

If element 1706 determines that the TPN stable timer 607 has not been started, the process extends to element 1710 where the timer is started. If the answer is yes in element 1706, the process extends over path 1707 to element 1712 which determines whether or not this timer has timed out. Thus, both paths 1707 and 1711 extend the process to element 1712 which now determines whether or not the TPN stable timer 607 is timed out.

If the timer has timed out then the process extends over path 1713 to element 1714 which determines whether or not all valid TPNs are at their maximum value. It has been priorly mentioned that the maximum value for a TPN is 30 and that a TPN of 30 represents a trouble condition in which the node may not be presently receiving valid timing signals. Therefore, element 714 determines whether or not a TPN of 30 is now being received on all links. It analyzes the contents of the A registers 616 through 619 to make this determination. If the answer is no, the process extends over path 1715 to element 1716. Element 1716 cuases the code of the priorly designated link with the lowest TPN (see FIG. 16) to be written into the A port of the timing source select register 602. This register controls the switch controller 508 to set timing source selector switch 504 to the position associated with the designated link having the lowest TPN.

The process now extends over path 1717 to element 1718 which determines whether or not the contents of the A section of the timing source select register 602 equals the contents in the B section of the register. If the answer is yes, this means that a new link has not been selected and the process continues over path 1719 to element 1720 which rests the PLL timer 606. This timer is normally in a timed out state and only then can one read the clock maintenance interface register 603. This register interacts with the phase lock loop 506 to determine whether or not the phase lock loop is currently responding to a valid timing signal so as to properly control the clock signal generator 507 to generate a valid timing signal for the node. This timer gives the phase lock loop 506 time to lock onto a new signal. This timer also gets reset after there is a change with respect to the link that is to control the timing of the node.

The process now extends over path 1721 to element 1722 which starts the PLL timer 606. The process then extends over path 1723 to element 1724 which transfers the contents of the A section of the TPN registers 616 through 619 to the B section of these registers.

The process continues over path 1725 to element 1726 which causes the contents of the read TPN timer 605 to be read. The timer is read and then the process extends over path 1726A to element 1728 which determines whether or not the timer has timed out. If it hasn't, the process loops over path 1727 and element 1726 and path 1726A and then once again 1728 until the timer does time out. This timer prevents the system from reading the TPNs too often.

Finally, a determination is made that the timer has timed out and the process continues over path 1729 to element 1730 which moves the contents of the TPN A registers to the TPN B registers. These are the register pairs 616 through 619. The process then continues over path 1731 to element F and from there back to element F on FIG. 15 where the processes already described are entered.

Briefly, the process of FIG. 15 outputs the current node TPN if the node TPN is not at its maximum value. It causes the node to become a source node if the node TPN is at its maximum value and the node is designated as a backup master node.

The following paragraphs describe the paths on FIG. 17 that have not been priorly described. Once again, element 1701 compares the A and B sections of the TPN registers 616–619 having the lowest TPN numbers and element 1703 determines whether there is any change detected in the lowest received TPN as a result of the comparison in element 1701. If a change is detected, the process extends over path 1704 to element 1732 which determines whether or not the precision oscillator 505 is selected and its code entered into register 602 to adjust switch 504. If the answer is yes, the process continues over path 1733 and the TPN stable timer 607 is reset in element 1737. If the answer of element 1732 is no, then the precision oscillator code is entered into the A portion of the timing source select register 602 and the process continues over path 1736 to element 1737. The resetting of the TPN stable timer prevents a new link from being selected until this timer times out. The process now continues over path 1738 to element 1726 which reads the contents of the read TPN timer 605 and then element 1728 determines whether or not the read TPN timer 605 is timed out. The function of element 1730 has already been described.

Thus, in partial summary, the process just described beginning with elements 1703 and 1732 caused teh precision oscillator to be selected. A new link will be selected as the nodes source of timing after the TPN fluctuations cease and the ssytem returns to a stable state as indicated by steady TPNs. However, a new link cannot be selected until after the TPN stable timer times out and we can be relatively certain that there will be no more fluctuations in the TPN A registers 616 to 619 containing the lowest TPN.

With reference to element 1712 let it now be assumed that the TPN stable timer 607 has not timed out. In this case the process extends over path 1739 to element 1726 and to the processes already described. In this case, the TPN A registers 616 to 619 containing the lowest TPN are stable, but the TPN stable timer 607 has not timed out, and a new link is not selected as a timing reference because there is till a high probability of further TPN changes.

With respect to element 1714 let it be assumed that all TPNs are at their maximum value. The process continues over path 1741 to element 1740 which enters the node of the precision oscillator into the timing source register 602. The process then continues over path 1742 to the elements beginning with 1726 whose function has already been described. In this case all valid TPNs in the TPN A registers 616 to 619 are at the maximum value, there could be no valid source of timing from any link since there is no operating master node in the network. Therefore the node timing will be generated from the precsion oscillator until this condition ceases.

With regard to element 1718 now let it be assumed that the contents of the A section of the timing source select register 602 do not match the contents of the B section of this register thereby indicating that the source of timing of the phase locked loop 506 has just been changed. In this case, the process continues over path 1743 to element 1744 which determines whether or not the PLL timer 606 has timed out. If it is not timed out, then the clock maintenance register 603 cannot be read and therefore the process now extends over path 1745 to element 1724 whose function has already been described. When the PLL timer 606 times out, this indicates that the phase locked loop 506 has been connected to an input signal sufficiently long enough to determine that it is operating properly and that the frequency of its input is not within its lock-in range. Then the process extends over path 1746 to element 1747 which reads the contents of the clock maintenance register 603. The contents of this register are a 1 when the phase lock loop 506 is operating properly and 0 when it is not operating properly. If element 1749 determines that this register's contents are a 1, then the process continues over path 1750 to element 1724 whose function has already been described. This indicates that the phase locked loop 506 is operating properly and is locked to and hence deriving timing from its input signal from timing source selector switch 504. Hence no corrective action is required. On the other hand, if element 1749 determines that the clock maintenance register contains a 0, this means that the phase lock loop 506 is not receiving a good timing signal. In this case, the process extends over path 1751 to element 1752 which causes the precision oscillator code to be entered into the A section of the timing source select register 602. This prepares the node to operate under control of its precision oscillator 505. The process then extends over path 1753 to element 1754 which writes an out of service bit of 1 next to the TPN of the selected link in the A section of the TPN register 616 through 619 associated with the selected link. This out of service bit of 1 in this register indicates that the phase lock loop 506 is having difficulty following the timing signal provided by the selected link. This determination was made when it was determined that the clock maintenance register 603 contains a 0 rather than 1.

A 0 in register 603 indicates that the phase lock loop 506 cannot successfully follow the timing signal to which the phase lock loop is currently connected by switch 504. That is the reason that element 1752 entered the precision oscillator code in the timing source select register 602 to cause the swtich 504 to connect the phase lock loop 506 to the output of the precision oscillator 505 and to disconnect it from the link providing the unreliable timing signal. Therefore, element 1754 writes an out of service bit of 1 into the A section of the TPN registers associated with this link. This out of service bit of 1 advises the processor 610 that this TPN for this link in this register should be disregarded until the system is reinitialized starting at element 1101 of FIG. 11. The reason for doing this is to prevent the clock system from attempting to synchornize to this defective link on subsequent reading of the TPNs. This condition persists until the out of service bit for this register is switched from a 1 to a 0 to indicate that the associated link may once again by providing a reliable timing signal.

The process next continues from element 1754 and over path 1755 to element 1756. This element causes an entry to be made in alarm register 614 to activate the alarm LED's 613. These provide an alarm to the maintenance personnel indicating that one of the incoming links is providing an unreliable timing signal. The maintenance personnel then take the appropriate action required to remedy the situation.

The process next advances over path 1757 to element 1724. The element causes the current contents of the A section of the timing source select register written into the B section of the register.

The process next advances over path 1725 to element 605 and the elements subsequent thereto. This portion of the flow chart has already been described.

On FIG. 6, conductors 511, 510, 604, 331, 325, 335, 425, 435 and 332, respectively are shown as being direclty connected to registers 603, 602, 611, 615, 616, 617, 618, 619, and 620, respectively for ease of understanding of the relationship between these conductors and registers. In practice, since node controller 601 is processor controlled, these registers would be part of the memory of microprocessor 610 and these conductors would be connected to I/O facilities of the microprocessor.

While a specific embodiment of the invention has been disclosed, variations within the scope of the appended claims are possible and are contemplated. There is no intention of limitation to what is contained in the abstract or the exact disclosure as herein presented. The above-described arrangements are only illustrative of the application of the principles of the invention. It is to be expected that other arrangements will be devised by those skilled in the art without departing from the spirit and the scope of the invention. In particular, an embodiment where the precision oscillator is replaced by a combination of a precision oscillator and one or more timing reference signals of origin outside the presently described network of nodes is contemplated.

What is claimed is:

1. A method of controlling the timing of each node in a multinode system whose nodes are interconnected by links and wherein a clock source in one of said nodes provides a reference clock signal source for controlling the timing of all other nodes in said system, said method comprising the steps of:
    (1) operating one of said nodes as a master node to control the timing of all nodes of said system,
    (2) transmitting a clock signal between each pair of said nodes directly interconnected by any one of said links,
    (3) including timing priority number (TPN) information in the clock signal transmitted between each pair of directly connected nodes with said information representing the number of intermediate nodes said clock signal has encountered in traveling from said master node to the node receiving said clock signal,
    (4) operating each clock signal receiving node, other than said master node, to analyze the TPN information it receives on all links to which it is connected to identify as a preferred clock signal the clock signal that has encountered the least number of intermediate nodes in traveling from said master node to reach said clock signal receiving node,
    (5) modifying the received TPN from the intermediate node generating said preferred clock signal,
    (6) transmitting the modified TPN to all intermediate nodes, and
    (7) operating each clock signal receiving node, other than said master node, to select said preferred clock signal as a reference timing source for said receiving node.

2. The method of claim 1 in combination with the additional steps of:
    (1) operating each node, other than said master node, to repeatedly scan said TPN information it receives,
    (2) detecting when the received TPN information associated with said preferred clock signal changes on successive scans, and
    (3) switching the timing control of each node that detects a change from said preferred clock signal to a signal from a local oscillator internal to said last named node upon the detection of said change.

3. The method of claim 2 in combination with the additional steps of:
    (1) operating said last named node to continue its repeated scanning of said received TPN information,
    (2) comparing the results of successive scans,
    (3) determining when said received TPN information remains unchanged for a predetermined interval of time, and
    (4) analyzing said received TPN information after the expiration of said interval to select as a preferred clock signal for said node the signal that has encountered the least number of intermediate nodes in traveling from said master node to said receiving node.

4. The method of claim 1 in combination with the additional steps of:
    (1) operating each node, other than said master node, to repeatedly scan said TPN information it receives,
    (2) operating one of said other nodes as a backup master node,
    (3) operating said backup master node to detect when said received TPN information associated with said preferred clock signal changes from a prior value to a predetermined value,
    (4) switching the timing control of said backup master node from said preferred received clock signal to a signal from a local oscillator internal to said backup master node upon the detection of said change to said predetermined value, and (5) transmitting a clock signal containing TPN information over directly connected ones of said links from said backup master node to control the timing of all nodes of said system other than said master node.

5. The method of controlling the timing of each node in a multinode system whose nodes are interconnected by links and wherein a clock source in one of said nodes provides a reference clock signal source for all other nodes in said system, said method comprising the steps of:
   (1) operating one of said nodes as a master node to control the timing of all nodes of said system,
   (2) including a timing priority number (TPN) in a clock signal transmitted from said master node over a direct link to at least another one of said nodes,
   (3) operating each node, other than master node, so that it alters a TPN it receives over a directly connected link in a prescribed manner to form a new TPN,
   (4) further operating each node, other than said master node, so that each said node sends a clock signal together with its altered TPN to all nodes to which it is directly connected by a link,
   (5) operating each node, other than said master node to identify one of the TPNs received as a preferred TPN based upon a prescribed relationship of said received TPNs, and
   (6) controlling the timing of said nodes, other than said master node, by the clock signal received over the link over which said preferred TPN is received by said node.

6. The method of claim 5 in combination with the additional steps of:
   (1) operating each node, other than said master node, to repeatedly scan the TPNs it receives,
   (2) detecting a change when the received TPNs associated with said preferred clock signal changes on successive scans, and
   (3) switching the timing control of said node that receives said changed TPNs from said preferred clock signal to a signal from a local oscillator internal to said last named node upon the detection of said change.

7. The method of claim 6 in combination with the additional steps of:
   (1) operating said last named node to continue its repeated scanning of said received TPNs,
   (2) comparing the results of successive scans,
   (3) determining when said received TPNs remain unchanged for a predetermined interval of time, and
   (4) analyzing said received TPN information after the expiration of said interval to select as a preferred clock signal for said node the clock signal received over the link on which a TPN having a prescribed relationship to the TPNs of other links is received.

8. The method of claim 5 in combination with the additional steps of:
   (1) operating each node, other than said master node, to repeatedly scan said received TPNs,
   (2) operating one of said other nodes as a backup master node,
   (3) operating said backup master node to detect when said received TPN associated with said preferred clock signal changes from a prior value to a predetermined value, and
   (4) switching the timing control of said backup master node form said preferred received clock signal to a signal from a local oscillator internal to said backup master node upon the detection of said change to said predetermined value, and
   (5) transmitting a clock signal contain a TPN over directly connected ones of said links from said backup master node to control the timing of all nodes of said system other than said master node.

9. A method of controlling the timing of a clock signal receiving node in a multinode system whose nodes are interconnected by links and wherein a clock source in a master one of said nodes provides a reference clock signal source for controlling the timing of all other nodes in said system, said method comprising the steps of:
   (1) receiving timing priority number (TPN) information together with a clock signal on each different link connected to said clock signal receiving node with said information representing the number of intermediate nodes each received clock signal has encountered in traveling from said master node to said clock signal receiving node,
   (2) operating said clock signal receiving node to analyze the TPN information it receives on all links to which it is connected to identify as a preferred clock signal the clock signal that has encountered the least number of intermediate nodes in traveling from said master node to reach said node,
   (3) modifying the TPN from the link from which said preferred clock signal was selected,
   (4) transmitting the modified TPN on all links to which said clock signal receiving node is connected, and
   (5) operating said signal receiving node to select said preferred clock signal as a reference timing source for said signal receiving node.

10. A method of controlling the timing of each node in a multinode system wherein said nodes are connected by links and wherein a clock source in a master one of said nodes provides a reference clock signal for all other nodes in said system, said method comprising the steps of:
   (1) interconnecting each of said nodes to one or more other ones of said nodes via said links,
   (2) transmitting a clock signal between each of said nodes directly interconnected by any one of said links,
   (3) activating one of said nodes to operate as a master node by providing a reference clock signal for controlling the timing of said system,
   (4) including a timing priority number (TPN) of n in the clock signal sent from said master node to all of said nodes directly connected to said master node by any one said links,
   (5) operating each node directly connected by a link to said master node and receiving said TPN of n to alter n by m to form a TPN of n+m characterizing each said directly connected receiving node,
   (6) further operating each node having a TPN of n+m to include said TPN of n+m in the clock signal transmitted to each one of said nodes to which said node having a TPN of n+m is directly connected by any one of said links,
   (7) operating all others of said nodes, other than said master node, that receives a TPN of n+m so that each of said other nodes alters a TPN it receives by m and transmits its altered TPN with a clock signal to each node to which it is directly connected by any one of said links, (8) operating each node that receives more than a single TPN, other than said master node, to select one of said received TPNs as a preferred received TPN, and (9) controlling the timing of each node, other than said master node, from clock signals transmitted over the link that applies the preferred TPN to said controlled node.

11. The method of claim 10 in combination with the additional steps of:

(1) operating each node, other than said master node, to repeatedly scan the TPNs it receives, (2) detecting a change when the received TPN associated with said preferred clock signal changes on successive scans, and (3) switching the timing control of said node that detects a changed TPN from said preferred clock signal to a signal from a local oscillator internal to said last named node upon the detection of said change.

12. The method of claim 11 in combination with the additional steps of:

(1) operating said last named node to continue its repeated scanning of said received TPNs, (2) comparing the results of successive scans, (3) determining when said received TPNs remain unchanged for a predetermined interval of time, and (4) analyzing said received TPNs after said interval to select as a preferred clock signal for said node the clock signal received over the link on which a TPN having a prescribed relationship to the TPNs of other links is received.

13. The method of claim 10 in combination with the additional steps of:

(1) operating each node, other than said master node, to repeatedly scan said received TPNs, (2) operating one of said other nodes as a backup master node, (3) operating said backup master node to detect when said received TPN associated with said preferred clock signal changes from a prior value to a predetermined value, and (4) switching the timing control of said backup master node from said preferred received clock signal to a signal from a local oscillator internal to said backup master node upon the detection of said change to said predetermined value, and (5) transmitting a clock signal containing a TPN over directly connected ones of said links from said backup master node to control the timing of all nodes of said system other than said master node.

14. Facilities for controlling the timing of each node in a multinode system whose nodes are interconnected by links and wherein a clock source in one of said nodes provides a reference clock signal source for controlling the timing of all other nodes in said system, said facilities comprising:

means for operating one of said nodes as a master node to control the timing of all nodes of said system, means for transmitting a clock signal between each pair of said nodes directly interconnected by any one of said links, means for including timing priority number (TPN) information in the clock signal transmitted between each pair of directly connected nodes with said information representing the priority of said clock signal, means for operating each clock signal receiving node, other than said master node, to analyze the TPN information it receives on all links to which it is connected to identify a preferred clock signal, means for modifying the TPN from the directly connected node which transmitted said preferred clock signal, means for transporting the modified TPN to all nodes directly connected to said clock signal receiving node, and means for operating each clock signal receiving node to select said preferred clock signal as a reference timing source for said receiving node.

15. The facilities of claim 14 in combination with:

means for operating each node, other than said master node, to repeatedly scan said TPN information it receives, means for detecting when the received TPN information associated with said preferred clock signal changes on successive scans, and means for switching the timing control of said node that receives said changed TPN information from said preferred clock signal to a signal from a local oscillator internal to said last named node upon the detection of said change.

16. The facilities of claim 15 in combination with:

means for operating said last named node to continue its repeated scanning of said received TPN information, means for comparing the results of successive scans, means for determining when said received TPN information remains unchanged for a predetermined interval of time, and means for analyzing said received TPN information after the expiration of said interval to select as a preferred clock signal for said node the signal that has encountered the least number of intermediate nodes in traveling from said master node to said receiving node.

17. The facilities of claim 14 in combination with:

means for operating each node, other than said master node, to repeatedly scan said TPN information it receives, means for operating one of said other nodes as a backup master node, means for operating said backup master node to detect when said received TPN information associated with said preferred clock signal changes from a prior value to a predetermined value, means for switching the timing control of said backup master node from said preferred received clock signal to a signal from a local oscillator internal to said backup master node upon the detection of said change to said predetermined value, and means for transmitting a clock signal containing TPN information over directly connected ones of said links from said backup master node to control the timing of all nodes of said system other than said master node.

18. Facilities for controlling the timing of each node in a multinode system whose nodes are interconnected by links and wherein a clock source in one of said nodes provides a reference clock signal source for all other nodes in said system, said facilities comprising:

means for operating one of said nodes as a master node to control the timing of all nodes of said system, means for including a timing priority number (TPN) in the clock signal transmitted from said master node over a direct link to at least another one of said nodes, means for operating each node, other than master node, so that it alters a TPN it receives over a directly connected link in a prescribed manner to form a new TPN, means for further operating each node, other than said master node, so that each said node sends a clock signal together with its altered TPN to all nodes to which it is directly connected by a link, means for operating each node, other than said master node, to identify one of the TPNs received as a preferred TPN based upon a prescribed relationship of said received TPNs, and means for controlling the timing of each said node, other than said master node, by the clock signal received over he link over which said preferred TPN is received by said node.

19. The facilities of claim 18 in combination with:

means for operating each node, other than said master node, to repeatedly scan said TPNs it receives, means for detecting a change when the received TPN associated with said preferred clock signal changes on successive scans, and means for switching the timing control of said node that receives a changed TPN from said preferred clock signal to a signal from a local oscillator internal to said node upon the detection of said change.

20. The facilities of claim 19 in combination with:

means for operating said last named node to continue its repeated scanning of said received TPNs, means for comparing the results of successive scans, means for determining when said received TPNs remain unchanged for a predetermined interval of time, and means for analyzing said received TPNs to select as a preferred clock signal for said node the clock signal received over the link on which a TPN having a prescribed relationship to the TPNs of other links is received.

21. The facilities of claim 18 in combination with:

means for operating each node, other than said master node, to repeatedly scan said received TPNs, means for operating one of said other nodes as a backup master node, means for operating said backup master node to repeatedly scan said received TPNs to detect when said received TPN associated with said preferred clock signal changes from a prior value to a predetermined value, and means for switching the timing control of said backup master node from said preferred received clock signal to a signal from a local oscillator internal to said backup master node upon the detection of said change to said predetermined value, and means for transmitting a clock signal containing a TPN over directly connected ones of said links from said backup master node to control the timing of all nodes of said system other than said master node.

22. Facilities for controlling the timing of each node in a multinode system wherein said nodes are connected by links and wherein a clock source in a master one of said nodes provides a reference clock signal for all other nodes in said system, said facilities comprising:

links for directly interconnecting each of said nodes to one or more other of said nodes, means for transmitting a clock signal between each of said nodes directly interconnected by any one of said links, means for activating one of said nodes to operate as a master node by providing a reference clock signal for controlling the timing of said system, means for including a timing priority number (TPN) of n in the clock signal sent from said master node to all of said nodes directly connected to said master node by any one of said links, means for operating each node directly connected by a link to said master node and receiving said TPN of n to alter n by m to form a TPN of n+m characterizing each said directly connected receiving node, means for further operating each node having a TPN of n+m to include said TPN of n+m in the clock signal transmitted to each one of said nodes to which said node having a TPN of n+m is directly connected by any one of said links, means for operating all others of said nodes, other than said master node, that receives a TPN of n+m so that each of sad other node alters a TPN it receives by m and transmits its altered TPN with a clock signal to each node to which it is directly interconnected by any one of said links, means for operating each node that receives more than a single TPN, other than said master node, to select one of said received TPNs as a preferred received TPN, and means for controlling the timing of each node, other than said master node, from clock signals transmitted over the link that applies the preferred TPN to said controlled node.

23. Facilities for controlling the timing of a clock signal receiving node in a multinode system whose nodes are interconnected by links and wherein a clock source in a master one of said nodes provides a reference clock signal source for controlling the timing of all other nodes in said system, said facilities comprising:

means for receiving timing priority number (TPN) information together with a clock signal on each different link connected to said signal receiving node with said TPN information representing the number of intermediate nodes each received clock signal has encountered in traveling from said master node to said signal receiving node, means for operating said signal receiving node to analyze the TPN information it receives on all links to which it is connected to identify as a preferred clock signal the clock signal that has encountered the least number of intermediate nodes in traveling from said master node to reach said signal receiving node, means for selecting said preferred clock signal as a reference timing source of said signal receiving node, means for modifying the TPN received from the link from which said preferred clock signal was received, and means for transmitting the modified TPN on all links to which said signal receiving node is connected.

24. Facilities for controlling the timing of a clock signal receiving node in a multinode system whose nodes are interconnected by links said facilities comprising:

means for receiving timing priority number (TPN) information together with a clock signal on each different link connected to said signal receiving node with said TPN information representing the relative priority of each received clock signal, means for operating said signal receiving node to analyze the TPN information it receives on all links to which it is connected to identify a preferred clock signal having a preferred priority, means for selecting said preferred clock signal as a reference timing source for said signal receiving node, means for modifying the TPN received from the link from which said preferred clock signal was received, and means for transmitting the modified TPN on all links to which said signal receiving node is connected.

25. A method of controlling the timing of each nodes in a multinode system whose nodes are interconnected by links and wherein a clock source in one of said nodes provides a reference clock signal source for controlling the timing of all other nodes in said system, said method comprising the steps of:

(1) operating one of said nodes as a master node to control the timing of all nodes of said system, (2) transmitting a clock signal between each pair of said nodes directly interconnected by any one of said links, (3) including timing priority number (TPN) information in the clock signal transmitted between each pair of directly connected nodes with said information representing the relative priority of the clock signal used by each transmitting node, (4) operating each signal receiving node, other than said master node, to analyze the TPN information it receives on all links to which it is connected to identify a preferred clock signal having a preferred priority, and (5) operating each clock signal receiving node, other than said master node, to select said preferred clock signal as a reference timing source for said receiving node, (6) modifying the TPN received from the link from which said preferred clock signal was received, and (7) transmitting the modified TPN on all links to which said receiving node is connected.

26. The method of claim 25 in combination with the additional steps of:

(1) detecting when the received TPN information associated with said preferred clock signal changes, and (2) switching the timing control of each node that detects a change from said preferred clock signal to another clock signal upon the detection of said change.

* * * * *